(12) United States Patent
Rand

(10) Patent No.: US 12,536,789 B2
(45) Date of Patent: Jan. 27, 2026

(54) TECHNIQUES FOR TRAINING SYSTEMS FOR AUTONOMOUS VEHICLE NAVIGATION

(71) Applicant: Mobileye Vision Technologies Ltd., Jerusalem (IL)

(72) Inventor: Chaim Rand, Modiin (IL)

(73) Assignee: Mobileye Vision Technologies Ltd., Jerusalem (IL)

( * ) Notice: Subject to any disclaimer, the term of this patent is extended or adjusted under 35 U.S.C. 154(b) by 1065 days.

(21) Appl. No.: 17/623,794

(22) PCT Filed: Oct. 16, 2020

(86) PCT No.: PCT/IB2020/059754
§ 371 (c)(1),
(2) Date: Dec. 29, 2021

(87) PCT Pub. No.: WO2021/074874
PCT Pub. Date: Apr. 22, 2021

(65) Prior Publication Data
US 2022/0253748 A1  Aug. 11, 2022

Related U.S. Application Data

(60) Provisional application No. 63/061,444, filed on Aug. 5, 2020, provisional application No. 62/915,848, filed on Oct. 16, 2019.

(51) Int. Cl.
*G06N 3/09* (2023.01)
*G06F 18/21* (2023.01)
*G06N 20/00* (2019.01)
*G06V 10/94* (2022.01)

(52) U.S. Cl.
CPC ............ *G06V 10/94* (2022.01); *G06F 18/217* (2023.01); *G06N 3/09* (2023.01); *G06N 20/00* (2019.01)

(58) Field of Classification Search
CPC .......... G06V 10/94; G06N 20/00; G06N 3/09; G06F 18/217
See application file for complete search history.

(56) References Cited

U.S. PATENT DOCUMENTS 10,467,503 B1 * 11/2019 Kim ...................... G06F 18/217
10,628,914 B1 *  4/2020 Donais .................... H04L 67/10
(Continued)

OTHER PUBLICATIONS

"How can I ues Dataset to shuffle" 2017 <https://github.com/tensorflow/tensorflow/issues/14857> (Year: 2017).*
(Continued)

*Primary Examiner* — Beau D Spratt
(74) *Attorney, Agent, or Firm* — Banner & Witcoff, Ltd.

(57) ABSTRACT

Techniques are disclosed for the implementation of machine learning model training utilities to generate models for advanced driving assistance system (ADAS), driving assistance, and/or automated vehicle (AV) systems. The techniques described herein may be implemented in conjunction with the utilization of open source and cloud-based machine learning training utilities to generate machine learning trained models. One example of such an open source solution includes TensorFlow, which is a free and open-source software library for dataflow and differentiable programming across a range of tasks. TensorFlow may be used in conjunction with many different types of machine learning utilities, such as Amazon's cloud-based SageMaker utility for instance, which is a fully-managed service that enables developers and data scientists to quickly and easily build, train, and deploy machine learning models at any scale.

16 Claims, 14 Drawing Sheets

(56) References Cited

U.S. PATENT DOCUMENTS

| | | | |
|---|---|---|---|
| 11,868,440 B1* | 1/2024 | Patel | G06F 17/18 |
| 11,954,603 B1* | 4/2024 | Ford | G06N 20/00 |
| 2014/0240231 A1* | 8/2014 | Minnen | G06V 40/20 |
| | | | 345/158 |
| 2019/0095785 A1* | 3/2019 | Sarkar | G06N 20/00 |
| 2019/0205667 A1* | 7/2019 | Avidan | G06F 18/28 |
| 2019/0221313 A1* | 7/2019 | Rim | G06F 18/217 |
| 2019/0228495 A1* | 7/2019 | Tremblay | B25J 9/1661 |
| 2020/0311604 A1* | 10/2020 | Gebre | G06F 12/0868 |

OTHER PUBLICATIONS

AWS "Power Machine Learning at Scale" May 2019 <https://d1.awsstatic.com/whitepapers/aws-power-ml-at-scale.pdf> (Year: 2019).*

Randa 11 Hunt: "Amazon Sagemaker Adds 1-20 Batch Transform feature and Pipe input Mode for Tensorflow containers", Jul. 20, 2018 (Jul. 20, 2018), XP055762415, Retrieved from the Internet: URL:https://aws.amazon.com/blogs/aws/sagemaker-nysummit2018/ [retrieved on Dec. 23, 2020].

Zhi-Lin Ke et al: "LIRS: Enabling efficient machine learning on NVM-based storage via a lightweight implementation of random shuffling", arxiv.org, Cornell University Library, 201 Olin Library Cornell University Ithaca, NY 14853, Oct. 10, 2018 (Oct. 10, 2018), XP081059728, DOI: 10.6342/NTU201803514.

International Search Report and the Written Opinion of the International Searching Authority dated Jan. 19, 2021, Application No. PCT/IB2020/059754.

* cited by examiner

TECHNIQUES FOR TRAINING SYSTEMS FOR AUTONOMOUS VEHICLE NAVIGATION

CROSS-REFERENCE TO RELATED APPLICATIONS

This application claims priority to provisional application No. 62/915,848, filed on Oct. 16, 2019, and to provisional application No. 63/061,444, filed on Aug. 5, 2020, the contents of each of which are incorporated herein by reference in their entireties.

TECHNICAL FIELD

Aspects described herein generally relate to training systems and, more particularly, to techniques that generate machine learning trained models.

BACKGROUND

Driving assistant products typically use artificial intelligence (AI) technologies. For example, autonomous vehicle (AV) system developers may need to train several different types of machine learning models targeted for the next generation of Advanced Driving Assistants, Autonomous Vehicles, and Road Experience Management products. This involves a vast infrastructure that needs to be fast, flexible, scalable, and secure. As this infrastructure may be costly and complex, the current means by which to achieve these goals to produce these trained models has been inadequate.

BRIEF DESCRIPTION OF THE DRAWINGS/FIGURES

The accompanying drawings, which are incorporated herein and form a part of the specification, illustrate the aspects of the present disclosure and, together with the description, and further serve to explain the principles of the aspects and to enable a person skilled in the pertinent art to make and use the aspects.

In the drawings, like reference characters generally refer to the same parts throughout the different views. The drawings are not necessarily to scale, emphasis instead generally being placed upon illustrating the principles of the disclosure. In the following description, various embodiments of the disclosure are described with reference to the following drawings, in which:

FIG. 13 illustrates an example table providing information on the heaviest operations, in accordance with various aspects of the present disclosure;

The exemplary aspects of the present disclosure will be described with reference to the accompanying drawings. The drawing in which an element first appears is typically indicated by the leftmost digit(s) in the corresponding reference number.

DETAILED DESCRIPTION

The following detailed description refers to the accompanying drawings that show, by way of illustration, exemplary details in which the aspects of the disclosure may be practiced. In the following description, numerous specific details are set forth in order to provide a thorough understanding of the aspects of the present disclosure. However, it will be apparent to those skilled in the art that the aspects, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

Figure 1:
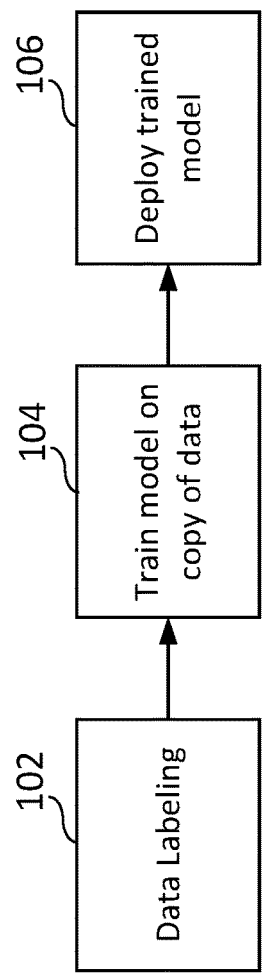
FIG. 1 illustrates a machine learning training flow, in accordance with various aspects of the present disclosure.

FIG. 1 shows an overview of the development cycle associated with a machine learning training process, in accordance with various aspects of the present disclosure. The machine learning training process uses a model that is trained using a set of data that is labeled in accordance with known data types for a particular application. The trained models may include, for example, a machine learning trained model that enables machine vision to recognize and classify objects included in a road scene, a driving model, or other suitable type of model (e.g. a safety driving model or driving policy model) which may be implemented, for example, as part of an advanced driving assistance system (ADAS), a driving assistance, and/or automated driving system (AV system).

The development cycle 100 as shown in FIG. 1 includes a labeling stage 102, a training stage 104, and a deployment stage 106. The amount of data used as part of the labeling stage 102 may be significant, such as 80 TB of data or more, for instance. The labeled data is then fed into a training stage 104, which generates a machine learning trained model (or simple a "trained model," or "model") for a particular application, which is then deployed in a particular use case (e.g. an AV) as part of the deployment stage 106.

As further discussed herein, ADAS and AV systems utilize object detection systems as a type of machine vision, which allows for the detection (e.g. recognition) and identification (e.g. classification) of objects in a road scene. The ADAS or AV system may use this information for various automated driving and/or navigation tasks, which may depend upon the location, environment, and type of object that is detected. For instance, the sensed data (and in some instances, map data) may be used to build an environmental model, and the environmental model may then be used by to construct a "state" that is used by the driving policy to determine an "action" that is to be carried out by the host vehicle. Therefore, it is preferable, and often necessary, for an ADAS or AV system to accurately and reliably identify the location of objects within a particular field of view corresponding to a specific road scene as well as what type of object has been detected. For instance, the road scene may correspond to the front view similar to what would be experienced by a driver driving the vehicle, or any other suitable field of view around the vehicle for which the detection of object locations and types may be useful for driving and/or navigation.

For the aspects described herein, which may implement trained machine learning models to facilitate machine vision for AV and ADAS systems, for example, the data labels may be associated with, for instance, pixels or other portions of a road scene. The labels may identify specific objects and/or object types with which the pixels of portions of the road scene are associated. Using the training data with predetermined or known labels, the model is then trained as data from the training dataset is received to converge to a trained model that behaves in a desired way, which may be evaluated based upon additional test images not included in the original training test data to determine the accuracy of the trained model. The machine learning trained model may then be deployed such that pixels or portions of images of a new road scene, which the trained model has previously not been exposed to, may be identified. For instance, for AV or ADAS machine vision systems, the goal is to achieve a trained machine learning model that accurately recognizes and classifies different types of objects, road lines, road types, etc. in a variety of different road scenes and conditions (e.g. day time, night time, during different types of weather, different types of vehicles and objects, etc.).

The use of machine vision as described above, which labels data associated with pixels or other portions of a road scene, is provided by way of example and not limitation. The aspects described herein may be adapted to implement any suitable type of data for which a model is to be trained for a particular application. As an additional example, the training data may correspond to non-visual machine learning applications, such as point cloud data for a light detection and ranging (LIDAR) sensor, for instance, with labels being applied to the point cloud data in any suitable manner. As yet additional examples, the training data may include other basic elements of a two- or three-dimensional representation such as a coordinate in a range map, a voxel in a three dimensional grid, etc. Irrespective of the particular type of training data that is used, the aspects described herein may label the data using predetermined or known labels identifying portions of the training data for use with the trained machine learning model, which then accurately recognizes and classifies different types of data for that particular application, based upon the type of training data used.

Therefore, for various applications such as ADAS and AV systems, machine learning is used to train such models as a fundamental part of their operation with respect to machine vision, identifying road objects, and performing specific actions based upon the recognition of those objects. However, and as noted above, such machine learning training techniques have various drawbacks, particularly with respect to the need to use expensive and complex infrastructure and the difficulty to meet required developmental goals. Thus, current AV system developers, as well as other industries that rely upon machine learning model training techniques, have begun to utilize open source and cloud-based machine learning training utilities to generate machine learning trained models for particular applications. One example of such an open source solution includes TensorFlow, which is a free and open-source software library for dataflow and differentiable programming across a range of tasks. TensorFlow is a symbolic math library, and is also used for machine learning applications such as neural networks. TensorFlow may be used in conjunction with many different types of machine learning utilities, such as Amazon's cloud-based Sagemaker utility for instance, which is a fully-managed service that enables developers and data scientists to quickly and easily build, train, and deploy machine learning models at any scale.

As an example, Sagemaker enables a number of capabilities including a secure and scalable environment in which one can essentially spin up as many training sessions as needed, and enables one to freely choose between multiple different types of machines. Moreover, Sagemaker allows one to decouple the storage of their training data from the actual training execution, and to run an entire development pipeline on the cloud, which includes data collection, creation, and quantization and deployment. However, as with any other framework, adopting SageMaker sometimes requires patience, resilience, and effort.

Thus, although not limited to such implementations, the aspects described herein may be used to adapt a machine learning training utility, such as Amazon Sagemaker, for instance, to the training models used for specific applications such as those used by AV system developers. In the various aspects further described herein, techniques are described to adapt deep neural network (DNNs) to a pipe mode that may be used in accordance with a machine learning training utility, which advantageously accelerates the development cycle.

The aspects herein are described in further detail with respect to using TensorFlow with Amazon Sagemaker, as these are commonly-used for machine learning training. However, these implementations are by way of example and not limitation. It will be understood that the aspects described herein may be applied to any suitable type of machine learning system, utility, and/or application without departing from the spirit and scope of the disclosure. For instance, the aspects described herein may use TensorFlow or other suitable libraries with Sagemaker or other machine learning training utilities, which may be cloud-based or part of a locally utilized infrastructure. As additional examples, Sagemaker supports other ML libraries such as PyTorch and mxnet. Moreover, other cloud-based providers support alternatives to Sagemaker such as Google Cloud ML and Microsoft Azure Machine Learning Studio, and these may also be implemented in accordance with the aspects described herein. Thus, the aspects described herein may implement any suitable type of machine learning library system in combination with any suitable type of machine learning training utility to generate machine learning trained models.

Figure 2:
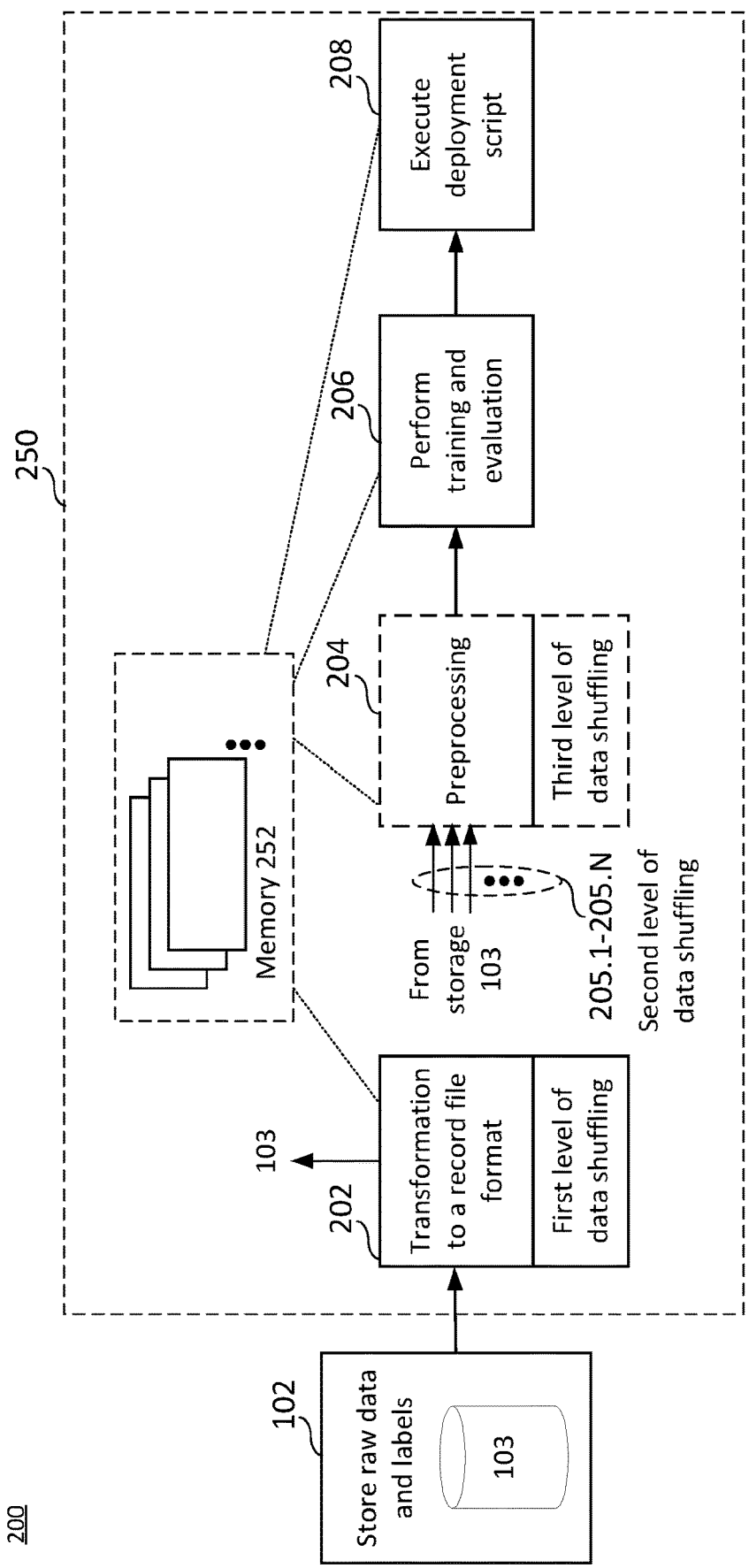
FIG. 2 illustrates a machine learning training flow, in accordance with various aspects of the present disclosure.

FIG. 2 illustrates an example flow for a cloud-based machine learning training utility, in accordance with various aspects of the present disclosure. Although referred to as a flow in FIG. 2, the flow 200 may be performed as part of a machine learning training process that implements any suitable type of hardware in conjunction with the various software solutions described herein. For example, the flow 200 may include a processing portion 250, which implements one or more processors and/or hardware-based processing devices. By way of example, the one or more processors included as part of the processing portion 250 may comprise one or more microprocessors, microcontrollers, pre-processors (such as an image pre-processor), graphics processors, a central processing unit (CPU), support circuits, digital signal processors, integrated circuits, memory, an application-specific integrated circuit (ASIC), part (or the entirety of) a field-programmable gate array (FPGA), or any other types of devices suitable for running applications, to perform data processing and analysis, to carry out instructions (e.g. stored in data storage 103, memory 252, etc.) to perform arithmetical, logical, and/or input/output (I/O) operations, and/or to control the operation of one or more components associated with the flow 200 to perform various functions associated with the aspects as described herein.

Any of the one or more processors implemented via the flow 200 may be configured to perform certain functions in accordance with programmed instructions, which may be stored in a local memory 252 associated with the one or more processors, data storage 103, and/or other accessible memory (not shown) as needed. In other words, a memory (e.g. data storage 103, memory 252, etc.) implemented via the flow 200 may store software or any suitable type of instructions that, when executed by a processor (e.g., by the one or more processors implemented via the processing portion 250), controls the operation of a machine learning model training process, e.g., the flow 200 as described by the functionality of the various aspects herein. A memory (e.g. data storage 103, memory 252, etc.) may store one or more databases, image processing software, etc., as well as various components of a specific type of machine learning model to be trained, such as a neural network, a deep neural network (DNN), and/or a convolutional deep neural network (CNN), for example, as further discussed herein. The data storage 103 and/or memory 252 may be implemented as any suitable non-transitory computer-readable medium such as one or more random access memories, read only memories, flash memories, disk drives, optical storage, tape storage, removable storage, cloud storage, or any other suitable type of storage.

For example, processing portion 250 may implement one or more processors such as a central processing unit (CPU), which is further discussed below with reference to FIG. 4. The processing portion 250 may include any suitable type of processing device, and may be implemented based upon the particular utility of which the flow 200 forms a part. For instance, the one or more processors implemented via the processing portion 250 may form part of a cloud-based machine learning training utility (e g Amazon Sagemaker), a local machine learning training utility including one or more servers and/or computing devices, or combinations of these. The training and evaluation stage 206 in particular may additionally implement one or more graphics processing units (GPUs), which are utilized to perform the forward and backward training iterations as discussed herein and further discussed below with reference to FIG. 4.

The various components used to implement the flow 200 are represented in FIG. 2 as blocks interconnected with arrows. For instance, the stage 102 may be identified with an implemented data storage 103 (e.g. S3, a local memory, could storage, etc.), whereas the stages 202, 204, 206, 208, etc. may be identified with processing portion 250, the implementation of one or more CPUs, GPUs, etc., and any accompanying memory 252 associated with these processing components, which function to perform part of an overall machine learning training process or algorithm represented by the flow 200. The arrows shown in FIG. 2 may thus represent respective data interfaces communicatively connecting the various stages of the flow 200 (e.g. the components implemented to provide the associated functionality). For example, a data interface may be coupled between stage 102 and stage 202 to facilitate loading data from data storage 103, which is then transformed via processing operations by one or more processors of the processing portion 250 at stage 202, as further discussed herein. The data interfaces shown in FIG. 2 may represent any suitable type and/or number of wired and/or wireless links, which may implement any suitable type and/or number of communication protocols.

The flow 200 as shown in FIG. 2 may use a solution referred to herein as "pipe mode," as well as alternatives to pipe mode, in various aspects. Therefore, before proceeding further with additional details of the present aspects, a discussion with respect to the pipe mode is warranted.

Pipe Mode

As an example, the aspects described herein may use TensorFlow with the Sagemaker PipeModeDataset or any other suitable solution based on Sagemaker's pipe-mode usage or other suitable types of data pipes in conjunction with a machine learning training utility. It may be particularly advantageous to utilize Sagemaker's pipe-mode when using large data sets for a particular machine learning training model. For instance, Sagemaker's pipe input mode is one of the main features offered in the Sagemaker environment, and is said to enable meaningful reductions in both train time and cost. Pipe mode is a mechanism (based on Linux pipes) for streaming training data directly from storage, which includes Amazon's cloud-based S3 storage in the Sagemaker example, to a particular training instance.

The conventional manner of achieving model training includes downloading all of the data from storage to the training instance via the Elastic Block Store (EBS). This needs to be done each time it is desired to spin up a new training session, and may cause a significant delay to the training start time. If a large data set is present, this may also incur significant storage costs, again, for each training instance. The use of data pipes, therefore, such as those used in accordance with Sagemaker pipe mode, for example, avoids this by essentially feeding the data directly to the algorithm as it is needed. This means that training can start as soon as the pipe is opened and no local storage is required and, in particular, using pipe mode decouples the data storage and training environment. In an aspect, the pipe stream may be implemented by any suitable number N of data pipes 205.1-205.N, which may comprise any suitable number of physical links, connections, ports, etc. to facilitate the aforementioned pipe mode data transfer for Sagemaker or other suitable pipe data modes. The data pipes 205.1-205.N as shown in FIG. 2 thus facilitate a transfer of data from the data storage 103, which may be Amazon S3 in this example, to the transformation stage 202 as discussed in further detail below.

An example of the code typically used to establish the PipeMode setup is shown below.

```
from sagemaker.TensorFlow import TensorFlow
TensorFlow = TensorFlow(entry_point='pipemode.py',
input_mode='Pipe',...)
train_data = 's3://sagemaker-path-to-train-data'
TensorFlow.fit({'train':train_data})
```

Once setup and initialized, pipe mode may be used to spin up as many training instances as desired and have them all point to the same data storage location, which may be the data storage 103 and, in this example, may comprise the Amazon S3 storage system. However, a significant drawback to pipe mode is that, in a pre-Sagemaker work flow, random-access control may be typically asserted over a dataset, which allows one to freely access any sample within the dataset. This ability enables control over how data is fed to the training pipeline, which may include control of the appropriate shuffling of the input data, enable boosting of certain subsets of data, etc. The TensorFlow dataset interface, however, essentially hides the low level from the user and provides support for all TensorFlow dataset operations (e.g. pre-processing, boosting, shuffling, etc.), and feeds this directly into the training pipeline.

An example of the code typically used to perform the PipeMode dataset initialization is shown below.

```
def parse(record):
feature = {'label': tf.FixedLenSequenceFeature([ ], tf.int64, allow_missing=True),
'image_raw': tf.FixedLenFeature([ ], tf.string)}
features = tf.parse_single_example(record, feature)
image = tf.decode_raw(features['image_raw'], tf.uint8)
label = features['label']
return {"image": image}, label # This is what will be fed into your model
ds = PipeModeDataset("train", record_format='TFRecord')
ds = ds.apply(map_and_batch(parse, batch_size=32, num_parallel_batches=2))
return ds
```

The example flow 200 as shown in FIG. 2 utilizes the labeling stage 102 as shown in FIG. 1, which again may include the use of data labels associated with, for instance, pixels or other portions of a road scene, for instance, in the example above that the trained model is to be used for an ADAS or AV application, or other suitable type of training data depending upon the particular application. However, the use of Sagemaker and many other training utilities requires the transformation of the training data into one of the data formats supported by the particular pipe mode data set, which Sagemaker refers to as PipeModeDataset. Continuing the example of using Sagemaker, these formats include TextRecords, TFRecords, and Protobuf, which is performed in the transformation stage 202. Thus, aspects include the transformation stage 202 generating, from the data received from the data storage 103, transformed record file data of a suitable format. This may include, for instance, using AWS batch service (on many parallel CPUs). This transformed record file data may then be stored in the data storage 103, which may be Amazon S3 in this example, and then streamed or otherwise provided (e.g. via the data pipes 205.1-205.N when pipe mode is implemented) to a training instance in the next stages of the flow 200 as discussed in further detail below.

Although it remains an option to use pipe mode with a different type of existing data format, using the PipeMode-Dataset provides a significant time savings in that pipe management is not required when the PipeModeDatset is implemented in this manner, and thus it is preferable to adopt one of the above formats. In an aspect, TFRecords is selected as the preferred format as shown in FIG. 2, although the aspects described herein may implement any suitable type of data formats for this purpose. Because TFRecords is TensorFlow's binary storage format, other types of data with different formats may be converted to the TFRecords format in a straightforward manner.

In an aspect, to modify the data creation flow, the development flow may be ported to Amazon Web Services (AWS) (or other suitable training utility) as well, which may advantageously further accelerate data creation time (from several days to a couple of hours) and thus further accelerate the overall development time. It should be noted that there are other options for accessing a large data set in S3, each with their own pros and cons. The AWS FSx service, for example, enables access to a full dataset and, at the same time, does not require any formatting changes to the training data. However, the aspects described herein may utilize the Sagemaker pipe mode alternative, which has been proven to be cost efficient.

Data Preparation

Regardless of the particular type of pipe input mode (or alternate mode) and the format that is used, aspects include ensuring that the training data is prepared accordingly, i.e. for the specific type of data format that is selected (e.g. TFRecords). Data preparation may include, for example, setting up a pipe by providing a storage prefix in accordance with the particular implementation (e.g. an S3 storage prefix). Thus, when the pipe (e.g. one or more of the data pipes 205.1-205.N) is opened, all of the files that match the given prefix are fed one-by-one into the pipe. The size of the files may impact the performance of the pipe. For instance, file sizes that are too small or too large will slow down the training cycle. Thus, a target file size should be selected that ensures quick and efficient operation, which may be determined from experimentation with a particular data set and/or known from previous training with similar types of data. For instance, the aspects described herein may utilize a predetermined target file size of 100 megabytes or other suitable sizes. Thus, aspects include using a set of conditions for the training process, with the first being that the training data is broken down into TFRecord files of approximately (e.g. +/−5%, 10%, etc.) of a predetermined file size (e.g. 100 megabytes) each.

Data Shuffling

As further discussed herein, data may be shuffled before the training stage 206, as shown in the example illustrated in FIG. 2. As noted above, the machine learning model training process is one that uses received training data to converge to a trained model that behaves in a desired way. Therefore, it is desirable to randomize, or "shuffle" the order in which the machine learning training process receives and processes the training data. Failure to do so may result in the model initially converging to recognize a specific type of data if similar images (e.g. all day time images) are first processed, and then being unable to successfully converge to recognize different image or scene types. Therefore, conventionally, and as noted above, reliance is placed on the ability to randomly access any sample in the dataset to ensure appropriate shuffling. However, given the sequential nature of the pipe input mode, the aspects described herein use a second condition that the training data be appropriately shuffled at various stages of the training process. In other words, full access to the training dataset may not be available at one time, and pipe mode allows for training to occur using access to a subset of the labeled training data contained in the data storage 103. As an example, the aspects described herein include leveraging the scale opportunities offered by the AWS batch service to accomplish this in a highly parallel and very efficient manner. However, to ensure a sufficiently random shuffling, the aspects described herein implement a multi-level shuffling process. Although the aspects are described with respect to three shuffling levels being performed for a particular machine learning trained model, the aspects described herein may utilize any combination of shuffling levels, which may be less than these three, as well as additional and alternate shuffling levels.

In an aspect, a first level of data shuffling may be performed as part of the transformation stage 202, and may include two different steps. The first of these steps includes performing an initial parsing and recording of the data records generated in the first stage 102. In other words, recording of the data records in this context includes maintaining a log of the samples that were created. The second step includes grouping records into the predetermined target file sizes and predetermined file formats (100 megabyte TFRecord files in this example) in a random fashion. The data may be separated into different groups, such as train and test datasets, for instance. In an aspect, this is done by using a different prefix for the train and test data, and then setting up corresponding pipes in the Sagemaker (or other suitable utility) start up script.

Thus, after the transformation stage 202, the data with the desired format (TFRecord in this example) is stored with a first level of shuffling been applied. However, as discussed above, the two-step process used in the first level of data shuffling may ensure an initial shuffling of the data in the data storage 103 (e.g. S3), but in some cases it is desirable to reshuffle the data before each data traversal (epoch). This can be accomplished quite trivially when the full data set is available, but the usage of the pipe mode, with its inherently sequential nature, complicates the solution needed to achieve reshuffling as only access to a subset of the data set is available.

Thus, the aspects described herein include the use of a second level of data shuffling as part of the order in which the transformed record file stored in the data storage 103 is "piped" to the next stage via the data pipes 205.1-205.N, as shown in FIG. 2. The second level of data shuffling may include, for instance, leveraging Sagemaker's ShuffleConfig class to set up each data pipe such that, before each data traversal, the order in which the files are fed into the data pipes for the training and evaluation stage 206 is shuffled. An example of the code used to perform the ShuffleConfig operation is shown below.

```
train_data = s3_input('s3://sagemaker-path-to-train-data',
    shuffle_config=ShuffleConfig(seed))
```

The second level of data shuffling is optional. Thus, the second level of data shuffling facilitates a shuffling of the order of data in the pipe stream that is provided to the training and evaluation stage 206. Again, because alternatives to pipe mode are possible as discussed further below, the data pipes 205.1-205.N may, in some aspects, not be used. In such a case, it will be understood that the data pipes 205.1-205.N may represent an alternative data interface structure in accordance with the particular implementation of data transfer from the data storage 103 to the training instance (e.g. the preprocessing stage 204 and the training and evaluation stage 206).

The second level of data shuffling may implement the aforementioned ShuffleConfig in conjunction with the Sagemaker pipe mode, for example, but the aspects are not limited in this regard. For example, aspects include alternate techniques to provide the second level of data shuffling with the other streaming methods as well. For example, assuming that TFRecordDataset is used, the order of the names of the files that are entered to the constructor, which essentially provides the same quality of shuffling (as ShuffleConfig in pipe mode), may alternatively be implemented.

A third level of data shuffling may optionally be implemented via the preprocessing stage 204. Thus, the preprocessing stage 204 is also optional, or may form part of the overall training and evaluation stage 206. In an aspect, the third level of data shuffling is performed with respect to the data received via the data pipes 205.1-205.N or via other suitable data streaming techniques in the preprocessing stage 204. The preprocessing stage 204 may be performed as part of the training instance, for example, after the data has been streamed (e.g. via the data pipes 205.1-205.N) to the training instance. Therefore, the second level of data shuffling is accomplished by piping the data files in a random order (i.e. it is not performed on the training instance, but rather by the pipe itself), whereas the third level of data shuffling is performed on the training instance as part of the preprocessing stage 204 to generate pre-processed data to the training and evaluation stage 206.

Once the data is shuffled via any combination of the first, second, and third levels of data shuffling discussed herein, aspects include the training and evaluation stage 206 using the pre-processed data output by the preprocessing stage 204 to generate a trained model for a particular application, which is then deployed for a particular use case (e.g. an AV) as part of the deployment stage 208. The deployment script may include, for example, transferring the trained model to a suitable component for use with a particular implementation and application. For instance, if the trained model is to be used for a machine vision application in an ADAS or AV system, then the trained model may be loaded onto an electronic control unit (ECU) of the vehicle in which the trained model is implemented.

Additional details regarding the implementation of the training and evaluation stage 206 is discussed further below with reference to FIG. 4. However, regardless of the particular application, the third level of data shuffling may be applied as part of the training instance, e.g. via the preprocessing stage 204, which may be implemented by shuffling at the file level, such as by using the TensorFlow dataset shuffle function, for instance. This function, when applied to the PipeModeDataset received from the data storage 103, receives a shuffle window size that causes each successive record to be randomly chosen from the next "window size" elements on the data pipe. The window size may selected as any suitable size, and may be a function of the number of records in each file, with consideration given to not add too much memory overload on the application.

It is noted that the solution above does not provide the same degree of shuffling that would be available in the event that access is provided to the entire dataset. For example, two records that appear in the same TF record file are more likely to appear in close vicinity of one another than at two opposite ends of the data stream. However, the three levels of data shuffling described above (i.e. during data creation, ShuffleConfig, and TF shuffle) are sufficient for most machine learning training purposes, including those used in accordance with AV applications.

Managing the Training Data and Data Boosting

Data boosting is a technique used as part of the machine learning model training process that attempts to compensate for under-represented samples of specific types of data in the training dataset. As further discussed herein, the aspects described herein may leverage the use of different data pipes 205.1-205.N output by the preprocessing stage 204 to serve this purpose. The use of several different data pipes 205.1-205.N may be particularly useful, for instance, to separate data into different subsets and manipulate the data differently during training time, which may include the ability to "boost" certain types of data samples. To provide an illustrative example, the previous example of a DNN model trained to identify cars in a road scene is once again referenced. The raw data and labels provided in the labeling stage 102 as shown in FIG. 2 may include 100,000 marked frames of a training dataset, which are then transformed into TF record files in the transformation stage 202 as described above. After a few rounds of training are executed, it is found that the resulting trained DNN succeeds in identifying most cars (e.g. provides bounding boxes and appropriate object classifications for most cars in various road scenes), but consistently fails to identify cars of a particular color. Upon further analysis of the training data, it is determined that only 10 training records include cars of this color. Thus, it may be desirable to "boost" cars of this color in the input pipe, meaning, during each epoch, 10 records with cars of this color are fed through twice. Likewise, the pipe input data may be reduced based on the behavior of the trained model. If free access was available to the entire data set, this would again be a fairly simple task. However, the use of data pipes complicates this task.

Thus, one approach to duplicate the number of records (10 in this example) for the data set in S3. This may not be a preferred solution, however, because such an approach could potentially increase the size of the data set, and the desired boost rate may often change throughout development. For instance, continuing the previous example, further assume that after the data boosting, the cars of the same under-represented color were successfully identified, but trucks of this color still were not. Thus, the boosting scale used for cars of this color may be reduced while the boosting scale of trucks of this color is increased.

To address this issue, the aspects described herein include alternatively creating a dedicated training pipe for the particular under-represented feature (e.g. cars of a specific color), and then (during the preprocessing phase of the training in preprocessing stage 204), interleaving between the PipeModeDataset corresponding to the particular under-represented feature and the PipeModeDataset corresponding to the rest of the training records with their corresponding appropriate weights, before feeding them to the network (e.g. the training and evaluation stage 206). In other words, under-represented data can be separated and fed using a dedicated pipe (e.g. of the data pipes 205.1-205.N), and the use of separate pipes enables a user to control ratio at which data is read in from each respective pipe, facilitating boosting in an analogous manner to duplicating records in storage (e.g. S3) without the need to actually do so. In an aspect, dataset APIs can be used to associate a weight with each pipe and interleave the pipes to achieve boosting in this manner. As an example, the tf sample_from_datasets routine may be implemented for this purpose, an example of the code used to do being shown below.

ds=tf.contrib.data.sample_from_datasets(datasets, weights)

In other words, aspects include the identification (e.g., via one or more processors in the processing portion 250) of under-represented transformed record file data based upon any suitable metric and/or threshold (e.g. recognition of a specific type of data or feature exceeding a predetermine threshold value), which may be determined after any suitable number of assess through the flow 200, including the training and evaluation of the transformed record file data via the training environment in stage 206. Then, for subsequent data passes (e.g. iterations or epochs), one of the data pipes 205.1-205.N may be selected and used as a dedicated data pipe to provide the under-represented transformed record file data for the training and evaluation of the transformed record file data in one or more subsequent passes through the training environment (e.g. the training and evaluation stage 206).

As another example in which having multiple pipes can be very useful, a practice in machine learning is to artificially increase the training data set by performing data augmentations. Conventionally, each one of a fixed set of augmentations is applied to each data record and fed to the network while ensuring appropriate shuffling. However, and as noted above, this relied on access to the full data set, which is not available when using the Sagemaker pipe mode. One solution to this issue would be to randomize the augmentation for each input record. However, some networks required the augmentation type to be fixed and ensure that each augmentation is applied to each of the records. Another solution is to create all of the different augmentations ahead of time but, once again, this would have be very wasteful and would not enable adjustment of the augmentation parameters.

Thus, aspects include addressing this requirement by creating the N parallel training pipes 205.1-205.N, with N being the number of different augmentation types. Each corresponding PipeModeDataset may be implemented with the corresponding augmentation function, following which all of the pipes may be interleaved together before being fed to the network. It should be noted that in this case, the ShuffleConfig object discussed above may be used to increase the likelihood that the different augmentations of a given record would be spread out rather than bunched together.

As discussed above, a number of different pipes may be implemented to obviate the need to duplicate records in storage and still achieve the desired boosting rates for various features. However, the AWS Sagemaker system, as well as most machine learning model training utilities, limits the number of pipes as a practical matter. As of this writing, this limitation stands at 20 pipe channels for Sagemaker Therefore, the aspects described herein facilitate a reduction in the number of pipes used. For instance, as an alternative to configuring pipes with an S3 prefix (as described above), a manifest file may be used. This may function as an alternative way to configure the pipe (e.g. a Sagemaker pipe). A manifest file also obviates the need to duplicate data by pointing to duplicate entries. That is, the manifest files may be created as part of the pipe configuration procedure to indicate that specific files are to be streamed multiple times, and explicitly point to a list of files that are to be fed into the network. In particular, if there are certain files that need to be traversed twice, these may be written into the manifest file twice to increase its weight. For example, instead of providing a path prefix and relying on SageMaker to collect all files, a manifest file may be created with the names of all the files to run per epoch. This may be a particularly useful solution for use cases in which more boost rates are desired than allotted pipes. An example of the code used to create manifest files is shown below.

```
trn_data = s3_input('s3://path-to-manifest-file', s3_data_
type='ManifestFile',
shuffle_config=ShuffleConfig(seed))
```

In summary, it is preferable to try to group data so that more than the maximum number of pipes will be needed. If this is not possible, then manifest files may be used. The ShuffleConfig setting may also be used to shuffle the order of the input files before each traversal, and the TensorFlow shuffle may be implemented for additional shuffling at the file level.

Multi-GPU Training

One of the advantages to using AWS Sagemaker is the ability to freely choose a training instance to match the current training job. In particular, one or more machines may be chosen with one or more GPUs. It is noted that the use of the Sagemaker framework and, in particular, Sagemaker pipe input mode, may drive some of the decisions regarding multi-GPU implementation.

For some training jobs, data parallelization may be performed over multiple GPUs (on a single instance) to speed up training (effectively increasing the batch size). In various aspects, two primary libraries are implemented. The first of these is the built-in multi-GPU TensorFlow support. If TensorFlow estimators are used, then this is a very attractive option as lines of code may be added (setting the appropriate strategy in a tf.estimator.RunConfig instance).

The second of these libraries includes the Horovod distributed training framework. The Horovid distributed training framework enables the addition of a wrapping layer to the training code that controls the number of training instances threads, and ensures appropriate data sharing (gradient sharing) between them. Sagemaker supports the Horovod configuration directly from the Sagemaker Framework constructor.

There is one significant difference in the way these two solutions work. While TensorFlow opens a single input stream that is shared by all GPUs, Horovod wraps the entire training script, including the data input flow. This means that if Horovod is used to train on an instance with 8 GPUs, 8 times as many pipes need to be configured compared to a single GPU job. Given the limitation on pipes mentioned above, it is understood that using Horovod may incur some limitations.

Alternatives to Using Pipe Mode

As discussed above, aspects may include the use of data pipes as part of a machine learning training process, which may include Sagemakers' PipeModeDataset, for instance, which is an implementation of the TensorFlow Dataset interface and hides low level pipe management from a user. As discussed above, using PipeModeDataset required reformatting of the training data into one of the supported file formats (e.g. text records, TFRecord, Protobuf, etc.).

However, in some scenarios it may be desirable to use alternatives to the PipeModeDataset or other particular pipe mode that may be implemented as part of the machine learning training process. For example, if there is a small dataset (e.g. a couple of hundred MB) or a dataset that can easily fit into a training instance's default EBS storage space, then there is the option of using File mode, which downloads all data to a local training instance one time before starting training. However, and as noted above, the training data set may include a significant size, which may often exceed 100 TB of data for ADAS and AV applications.

Therefore, using pipe mode presents significant advantages with respect to the use of such large datasets, but comes at a loss of the control over the training flow to Sagemaker or another suitable machine learning training utility. There may be situations in which such this loss of this control is not acceptable and complete control is desired. For instance, it may be desirable to control and/or record precisely what files are being fed into the pipeline and in what order. Moreover, it may be desirable to control and/or record the mechanism being used to shuffle the files before each epoch, or there may be issues when using pipe mode and a technique with greater visibility into the inner workings and better ability to debug is required. The aspects described herein facilitate this flexibility using Sagemaker's built in TensorFlow TFRecordDataset.

One illustrative example in which it may be desirable to have greater control over the input pipeline is dynamic boosting. For instance, as discussed above, aspects include using boosting in the machine learning training process to artificially increase the representation of certain subclasses of data (e.g. specific colors or cars or trucks cars), which was implemented when training with pipe mode. In one of the aspects described herein, the data pipes 205.1-205.N were configured using a manifest file (e.g. a Sagemaker manifest file), which was filled with pointers to TFRecord files of different classes and weighted according to the desired boosting weights. In some cases, however, this might not be sufficient, as the manifest files are static in nature and cannot be updated or changed once the training process is started (e.g. between passes or epochs). For instance, there may be scenarios in which "dynamic boosting" is required, such that the weights of each class may be continuously during the training process (e.g. between passes or epochs). Many machine learning model training utilities, however, do not support this feature, including Sagemaker.

As another example scenario, assume that a particular application requires intensive processing in the preprocessing stage 204 to properly configure the input data pipeline, which includes the data pipes 205.1-205.N. This processing could be implemented using TensorFlow operations directly on the tf records, but many operations can be implemented more easily in other libraries (e.g. python) using numpy, scikit, opencv, etc. Of course, python code can be created using TensorFlow.py_func, but this can easily become a bottleneck due to a combination of the python Global Interpreter Lock (GIL) and the manner in which TensorFlow parallelizes the py_func in the dataset map call. It thus may be preferable to stream data in a python-friendly format, such as pickles or npy files, perform the heavy processing in python (using multiple processes to bypass the GIL limitations), and only then hand it over to TensorFlow. The aspects described in further detail below perform this functionality by reading directly off of the pipe data (e.g. in Sagemaker) and using the tf.from_generator dataset.

Furthermore, there may be other reasons why converting data to one of the required data formats may be infeasible and/or reasons why random access is required to any one of the records at any point in time. It may also be desirable to be able to perform the training process as if all data was stored locally, regardless of format. It may be significantly useful in such scenarios to implement the Sagemaker fsx, as further discussed below.

Measuring Throughput

In the aspects described herein, one of the primary goals is to maximize the throughput of the training process, i.e. the number of training steps per second. Each of the optional aspects further discussed herein includes various pros and cons, but the key indicator by which each is compared to one another is how each technique impacts the throughput, i.e. at what rate can data be pulled from storage (e.g. S3) and entered into the training pipeline (e.g. the data pipes 205.1-205.N). One way to isolate and test the throughput over the network is to simply iterate over a dataset without actually performing any training, as shown in the example below (written in TensorFlow 1.14). This can then be compared to the training throughput to assess whether the bottleneck is IO.

```
iter = ds.make_one_shot_iterator( )
n = iter.get_next( )
count = 0
begin = time.time( )
with tf.Session( ) as sess:
    stime = time.time( )
    while count < 10000:
        sess.run(n)
        count = count + 1
        if count % 100 == 0:
            etime = time.time( )
            print("step: "+str(count)+" step/sec: { }".format(float(100)/ (etime - stime)))
            stime = time.time( )
```

Another consideration is the network bandwidth of the training instance. For instance, AWS has published a table of the maximum expected network performance per instance type (https://aws.amazon.com/sagemaker/pricing/instance-types/). This table may be used to assess current efficiency. However, there are some additional things to keep in mind when considering network performance In particular, just because an instance has a certain bandwidth capacity does not mean that, when data is streamed from S3, ec2, or some other source, the full bandwidth is being utilized. This might depend on a host of other things, such as the network bandwidth of the source, whether Elastic Network Adapter (ENA) is enabled and to what degree the streaming functionality has been optimized, etc.

Thus, the advantage to pipe mode is that such metrics have already been considered and the pipe mode and Pipe-ModeDataset optimized by the provider of the machine learning training utility (e.g. Sagemaker), as the providers are well motivated to utilize the bandwidth to its maximum. Again, however, there are situations in which alternative options should be considered. As discussed further herein, the aspects include four alternatives to using pipe mode, which include TFRecordDatasets pointing directly to files in S3, parsing the raw Sagemaker input pipe, downloading data files directly from S3, and FSX.

TFRecordDataset

TFRecordDataset (https://www.TensorFlow.org/api_docs/python/tf/data/TFRecordDataset) is a dataset implemented by TensorFlow that takes a list, or dataset of TFRecord file paths as input and iterates over the TFRecords in each of the files. Advantageously, the files' paths can include paths to files in S3. Furthermore, the TFRecordDataset constructor has two control parameters: buffer_size and num_parallel_reads, which can be used to optimize the IO throughput when reading from a remote location. The example code provided below represents an example of how a TFRecordDataset may be initialized in this manner with the list of files from a Sagemaker manifest file:

```
def get_list_from_manifest(manifest_file):
    with open(manifest_file) as f:
        manifest = json.load(f)
        prefix = manifest[0]['prefix']
        return [path_join(prefix, tf) for tf in manifest[1:]]
tf_record_filepaths = get_list_from_manifest(manifest_file)
ds = tf.data.TFRecordDataset(tf_record_filepaths, num_parallel_reads=10, buffer_size=100000000)
```

The settings for buffer_size and num_parallel_reads should be noted. With this example, comparable throughput performance was reached to that of PipeModeDataset on an ml.p3.8×large instance, as shown in the evaluation comparison of throughput performance in FIG. 3.

Thus, when implemented, this aspect provides a number of significant advantages to the method utilized for the PipeModeDataset. First, greater control is achieved because, as mentioned herein, PipeModeDataset typically operates a "black box." For instance, a list of files may be provided, and a user is then forced to rely on Sagemaker to shuffle and stream these with little visibility into the internal workings, including what file is being streamed at any given moment. The list of files cannot be changed during training and, in particular, cannot there is no implementation of dynamic boosting. The aspects described herein may utilize the PipeModeDataset, for example, to provide greater control and greater visibility. An example of the code to enable such dynamic boosting with two classes, while implementing shuffling and printing of each file being streamed, is shown below. It should be noted that this code is provided by way of example and for ease of explanation of the overall concept, and may of course be further optimized, and can easily be extended to a greater number of classes.

```
import random, numpy as np, TensorFlow as tf class MyIter(object):
    def __init__(self,class1_list, class2_list):
        self.class1_list = class1_list
        self.class1_list_len = len(class1_list)
        self.class1_index = 0
        self.class2_list = class2_list
        self.class2_list_len = len(class2_list)
        self.class2_index = 0
        self.boost_weight = 0.5
```

```
        self.cont = True
    # this can be used to update wieght mid-training
    def update_boost_weight(self, weight):
        self.boost_weight = weight
    def hault(self):
        self.cont = False
    def from_class1(self):
        if self.class1_index == 0:
            random.shuffle(self.class1_list)
        file_path = self.class1_list[self.class1_index]
        self.class1_index = (self.class1_index+1)%self.class1_list_len
        return file_path
    def from_class2(self):
        if self.class2_index == 0:
            random.shuffle(self.class2_list)
        file_path = self.class2_list[self.class2_index]
        self.class2_index = (self.class2_index+1)%self.class2_list_len
        return file_path
    def generator(self):
            while self.cont:
                class_type = np.random.choice(2, 1, p=[self.boost_weight,1-self.boost_weight])[0]
                next_file = self.from_class1( ) if class_type == 1 else self.from_class2( )
                print("feeding file "+next_file)
                yield next_file
myiter = MyIter(list1,list2)
filepaths = tf.data.Dataset.from_generator(myiter.generator,output_types=tf.string, output_shapes=( ))
ds = tf.data.TFRecordDataset(filepaths, num_parallel_reads=10, buffer_size=100000000)
```

TFRecordDataset also offers advantages over PipeModeDataset with respect to debugging. Other than the obvious advantages to debugging of greater visibility (e.g. identifying a corrupted tf record file), contrary to PipeModeDataset, TFRecordDataset supports local mode. This means that the full data pipeline may be tested, including the input pipeline, locally, before uploading to a Sagemaker instance.

Furthermore, and contrary to Sagemaker pipe mode that has a limitation of 20 channels per device, there is no limitation to the number of TFRecordDataset that may be created. Of course, each dataset requires system resources, so there is a practical limitation in this regard.

Parsing the Raw Pipe

While TFRecordDataset supports a limited set of formats, anything may be streamed over Sagemaker pipes. For example, python pickle files may be streamed. To ensure efficient pipe throughout, aspects include concatenating several pickle files together into files to a desired (e.g. predetermined) target size (e.g. approximately 100 MB). The TFRecord file format may also be implemented, which is a concatenation of records of the format defined below, as follows:

Length—8 bytes
Length CRC—4 bytes
Data—Length bytes
Data CRC—4 bytes

The example code below demonstrates using this technique to create a dataset from a generator that manually parses TFRecord files. This code snippet can be further modified to parse files with concatenated pickles, which may be followed up with python processing (using multiprocess to work around the GIL).

```
def get_pipe_generator(channel_name, num_epochs=1):
    import struct
    def generator( ):
        for epoch in range(num_epochs):
            fifo_path = '{0}/{1}_{2}'.format(data_dir, channel_name, epoch)
            with open(fifo_path, 'rb', buffering=0) as fifo:
                cont = True
                while cont:
                    try:
                        recordLen = fifo.read(8)
                        recordLen = struct.unpack('Q', recordLen)[0]
                        # TODO: don't be lazy!! Check the crc
                        crcCheck = struct.unpack('I', fifo.read(4))[0]
                        # TODO: add a loop to verify that you read recordLen bytes
                        rec = fifo.read(recordLen)
                        # TODO: don't be lazy!! Check the crc
                        crcCheck = struct.unpack('I', fifo.read(4))[0]
                        yield rec
                    except:
                        cont = False
    return generator
ds = tf.data.Dataset.from_generator(get_pipe_generator('train'),output_types=tf.string, output_shapes=( ))
```

Working with the raw pipes also offers added flexibility. For example, suppose a dataset is divided into two separate classes streaming over two separate data pipes. The current aspect allows for controlling the rate at which data is sampled data from each data pipe, which may be used to implement dynamic boosting as discussed herein.

Downloading and Parsing Data Files

If both the visibility afforded by working directly with S3 (e.g. the TFRecordDataset option), as well as the flexibility of working with a python format such as pickles is desired, aspects include downloading and parsing the data files separately from the built in functionality afforded by the machine learning training utility. Thus, the aspects described in this section illustrate how this may be implemented. In this example, multiple parallel threads are used to download and parse the TFRecord files. The resultant records are then fed into a shared queue, which can be fed into data processor threads or directly into a dataset (e.g. using tf.data.Dataset. from_generator). Once again, this is by way of example and not limitation, and aspects include modifying the code to adapt to other formats.

```
import struct, boto3, io
from threading import Thread
from queue import Queue as Q
def file_parser(index, file_list, batch_queue):
    session = boto3.session.Session( )
    s3 = session.resource('s3')
    for s3_path in file_list:
        bucket, key = s3_path.replace('s3://','').split('/', 1)
        tc = boto3.s3.transfer.TransferConfig(max_concurrency=10,
            multipart_chunksize=8388608, num_download_attempts=5,
            max_io_queue=100, io_chunksize=262144)
        ioStream = io.BytesIO( )
        s3.meta.client.download_fileobj(bucket, key, ioStream, Config=tc)
        ioStream.seek(0)
        recordLen = ioStream.read(8)
        while recordLen:
            recordLen = struct.unpack('Q', recordLen)[0]
            # TODO: don't be lazy!! Check the crc
            crcCheck = struct.unpack('I', fifo.read(4))[0]
            # TODO: add a loop to verify that you read recordLen bytes
            rec = fifo.read(recordLen)
            # TODO: don't be lazy!! Check the crc
            crcCheck = struct.unpack('I', fifo.read(4))[0]
            batch_queue.put(rec,block=True)
            recordLen = ioStream.read(8)
q = Q(maxsize=10)
num_threads = 40
for i in range(num_threads):
    w = Thread(target=file_parser, args=[files[i::num_threads], q])
    w.start( )
```

Using Managed Third-Party File System Solutions (e.g. FSx)

Training on Sagemaker using FSx is a good solution to provide a traditional, file-system style access to data without downloading the training datasets to local EBS storage, due to their size, the cost, download time, etc. Thus, the aspects described in this section use FSx, which requires appropriate configuration as described at https://aws.amazon.com/blogs/machine-learning/speed-up-training-on-amazon-sagemaker-using-amazon-efs-or-amazon-fsx-for-lustre-file-systems.

It should be noted that the storage capacity of the file system should be chosen with consideration of the throughput capacity, as this will impact the speed at which the data may be accessed. Typically, the larger the storage capacity, the larger the throughput capacity. Unfortunately, the larger the storage capacity, the higher the cost of FSx. One advantage, however, is that the same file system may be used across multiple SageMaker jobs, which can reduce the cost per-session, if there are many training sessions that access the same data.

It should also be noted, however, that the files are only copied from S3 to FSx the first time they are accessed. This means that the throughput measured on the first epoch might be measurably lower that the throughput on subsequent epochs. Thus, the decision to implement FSx depends on a number of factors, including dataset size, FSx cost, the number of training sessions, and the need file-system style access to data.

Evaluation

Figure 3:
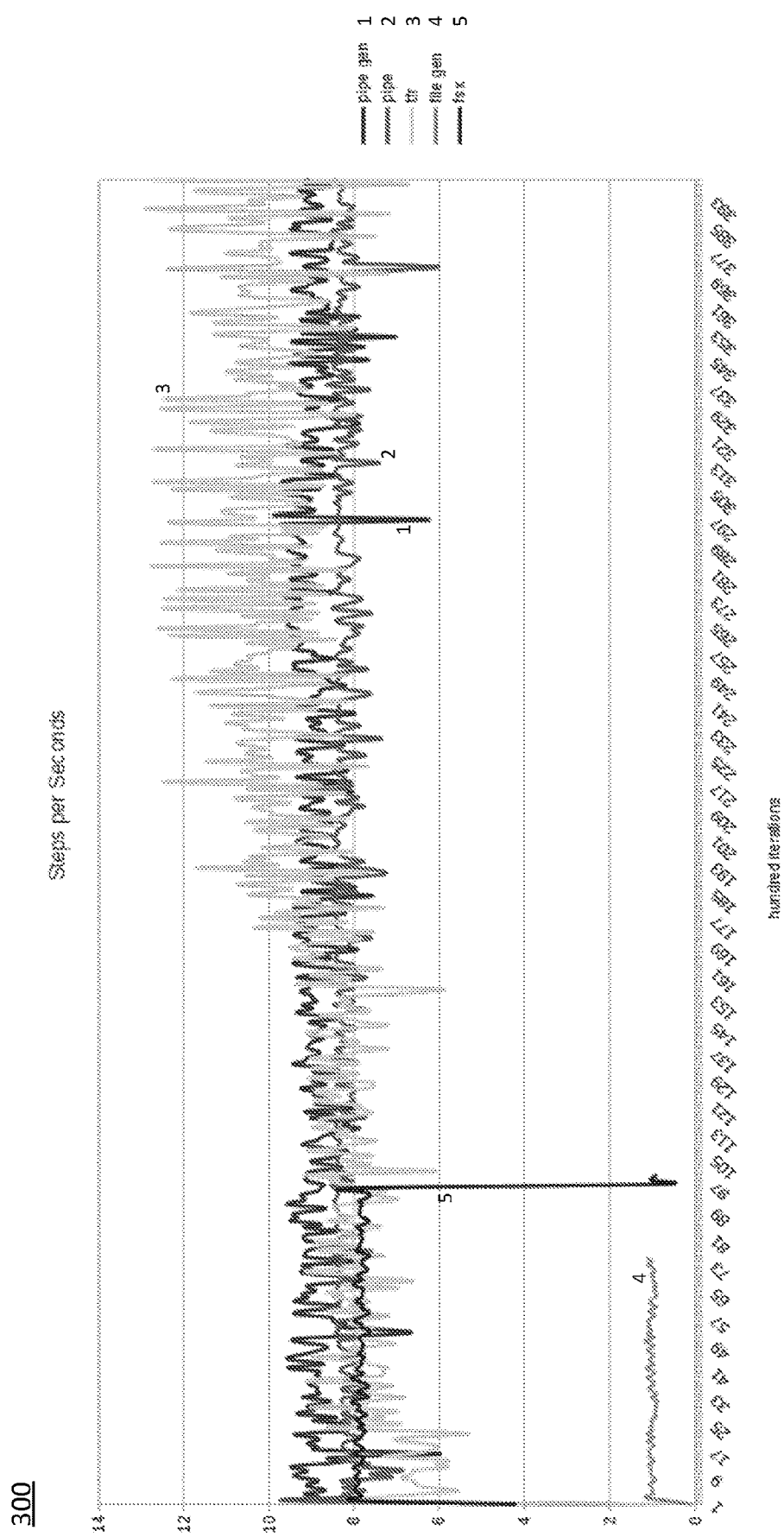
FIG. 3 illustrates a chart comparing the throughput, measured in batches per second, for five different methods of pulling training data from storage, in accordance with various aspects of the present disclosure.

FIG. 3 illustrates a chart comparing the throughput, measured in batches per second, for five different methods of pulling the training data from S3. These include the following:

1. Reading and parsing the TFRecord files off of the raw Sagemaker pipe and wrapping these with tf.data.Dataset.from_generator (pipe gen);
2. Using PipeModeDataset (pipe);
3. Using TFRecordDataset pointing to file objects in S3 (tfr);
4. Downloading the TF record files directly from S3, reading and parsing them and wrapping them with tf.data.Dataset.from_generator (file gen); and
5. Using TFRecordDataset pointing to the files in FSx (fsx).

The trials associated with the chart in FIG. 3 were executed on ml.p3.8×large (10 Gigabit per second network performance). While the absolute values of the throughput are dependent on application-specific data record size, batch size, etc., the relative values clearly show the throughput of the tfr and pipe gen options to be comparable to PipeModeDataset. Note that the performance of the TFRecordDataset is more "choppy" than the other options. If the throughput of the end-to-end training pipeline is sensitive to such choppiness, this may be something to consider.

As shown in FIG. 3, the file gen trial timed out after only 7500 iterations, but the concept is still adequately demonstrated, although additional modification and tuning would be required to optimize the usage for a particular implementation.

Furthermore, and as shown in FIG. 3, the fsx throughput starts high and then drops suddenly before timing out. The reason for this is that the while, for the first 9600 iterations, files are accessed that have already been copied to the file system, but then files are read that are being accessed for the first time. This means that FSx is only first copying them from S3.

Performance Analysis and Training Optimization

As noted above with respect to FIG. 2, the training and evaluation stage 206 receives the preprocessed data, which may include the use of pipe mode or other alternatives discussed above. The training and evaluation stage 206 incorporates the received data, which may be shuffled and boosted as discussed herein, to generate a machine learning trained model that is deployed for a particular application, such as ADAS and AV systems, for instance. This section provides additional details regarding how the training and evaluation stage 206 may be performed, evaluated, and tuned to achieve the desired results for a particular implementation, with a focus on identifying and preventing data bottlenecks to improve training performance Again, although the aspects described herein may be applicable to any suitable type of machine learning training utility, the previous example is used for purposes of clarity and ease of explanation throughout this section. In various aspects, similar or identical metrics that are described herein that are derived via Sagemaker to identify training performance and utilized to further improve the training operation may be obtained via any suitable alternate means.

Continuing the previous example of using Amazon SageMaker and Amazon S3 services to train DNNs (or other suitable machine learning models) on large quantities of data, the performance of a DNN training session running in TensorFlow may be profiled for further analysis. As used herein, the term "performance" profiling of a machine learning training session may reference the analysis of the speed at which the training is performed (as measured, for example, by the training throughput or iterations per second), and the manner in which the session utilizes the system resources to achieve this speed.

The aspects further described in this section thus enable a user to determine why the training is running slowly and how this speed may be increased. Again, the examples provided herein are written in TensorFlow and run in the cloud using the Amazon SageMaker service, but the aspects described herein are equally applicable to any other suitable training environment. The aspects aim to maximize (or at least increase) the throughput of a training session, given a fixed training environment, without harming the quality of the resultant model or increasing the number of training samples required for convergence. For purposes of clarity and ease of explanation, the aspects described herein proceed under a few underlying assumptions.

For example, it is assumed for ease of explanation that the training is being performed on a single instance/machine and that the instance type is fixed. Of course, different models perform differently on different types of machines. In an ideal situation, a machine that is optimal for the model being trained could be chosen, that is, a machine on which all resources would be fully utilized. In this way, the cost of resources that are not being used could be avoided. Unfortunately, as a practical matter, the real world, there is usually a restraint with respect to a fixed number of instance types to choose from. For example, Amazon SageMaker offers a wide variety of instance types (https://aws.amazon.com/sagemaker/pricing/instance-types/) to choose from that differ in the types and number of GPUs, the number of CPUs, the network properties, memory size and more. On the other hand, one does not have the ability to freely choose (based on the properties of my model) a machine with a specific number of CPUs, a specific GPU, and specific network bandwidth.

Therefore, to choose a most appropriate training instance, one must carefully weigh how well a model is suited to different training instances versus considerations such as the cost and availability of those instances, as well as scheduling requirements. This requires a comprehensive analysis of the maximum achievable performance of training the model on each of the different instances types, as further described herein. The examples provided herein are limited to instance types with a single GPU for clarity. Specifically, the examples discussed herein are provided with respect to machines with an NVIDIA® V100 Tensor Core GPU. In the context of the Amazon SageMaker service for training, this is the ml.p3.2xlarge instance type.

There are many different libraries and frameworks available for training DNN models. The training performance of a fixed model, fixed training algorithm, and fixed hardware, will vary across different software solutions. The examples provided herein are with respect to the TensorFlow training environment. However, even within this training environment, performance may depend on a number of factors such as the framework version, whether a high level API is selected such as tf.estimator or tf.keras.model.fit, whether a custom training loop is implement, and the manner in which the training data is fed into the training pipeline. Thus, the examples provided herein are provided under the assumption that the training is performed in TensorFlow 2.2 using the tf.keras.model.fit( ) API, and that the data will be fed using the tf.dataset APIs. Again, this is but one implementation by example and not limitation, and the aspects described herein may be expanded to any suitable type of training system.

Rules and Constraints

In an aspect it is recognized that actions to accelerate the training process does not harm the quality of the resultant model. Therefore, an additional constraint is used for this purpose, i.e. to not harm the overall time required for training convergence, as measured in the overall number of training samples fed into the network until convergence. To do so, a simplifying assumption is made that a model requires a fixed number of training samples to converge and that the options to optimize will not change that fixed number. Based on this assumption, and given a fixed instance and software environment, the goal is to optimize the overall amount of time (in seconds) that the training takes or, alternatively, the training throughput, measured in the number of samples being processed by the training loop per second.

This constraint is introduced for ease of explanation. There may be situations where a change to the model architecture would increase the number of samples required for convergence, while reduce the overall time to convergence. For example, reducing the bit precision of some of the variables is likely to increase the throughput, but also might require more steps to converge. If the overall time to train is reduced, and the resultant model predicts just as well, then this would be a great optimization. Another example is increasing the batch size, which is one of the basic ways to increase throughput. However, there are some models for which the training quality may be sensitive to the batch size, and thus the aspects described herein assume that such an impact is negligible and can be overcome by tuning other hyper-parameters (such as the learning rate).

In accordance with the aspects described herein, the units used to measure the throughput are the average number of samples processed by the training loop per second. An alternative and more common unit measurement for throughput is the average number training iterations per second, steps per second, or batches per second. However, since this measurement is based on the chosen (global) batch size, this presents difficulty to compare between runs that use different batch sizes. Therefore, to extract this measurement, one may either rely on the logs that are printed by TensorFlow (at the end of every epoch), or implement a customized measurement (e.g. with a custom TensorFlow callback).

In an aspect, a primary technique for increasing training throughput is by increasing the utilization of the resources on the training instance. In theory, any under-utilized resource is a potential opportunity to increase throughput. But practically speaking, once the GPU (the most expensive and important system resource), is fully utilized, and assuming the performance of GPU operations are adequate, then this is typically a sufficient level of optimization. However, although some of the training could be offloaded to the CPU, the performance gain would be negligible (if at all) and thus not worth the effort to do so.

Moreover, under-utilization could be a result of the pipeline not reaching its maximum capacity (e.g. all of the resources are under-utilized). In this case, increasing the throughput is fairly easy, (e.g. simply increase the batch size). If the pipeline is at maximum capacity, under-utilization of a system resource is typically the result of a bottleneck in the pipeline. For example, the GPU might be idle while it waits for training data to be prepared by the CPU. In such cases, aspects include attempting to increase the throughput by removing the bottleneck. For example, parallelization may be introduced between the CPU and GPU so that the GPU does not need to wait for data.

In the aspects described herein, the general strategy is to perform the following two steps recursively until the throughput is greater than or equal to some predefined threshold, and thus the throughput goal is reached, or until the GPU is fully utilized.

The first of these steps is to profile the training performance to identify bottlenecks in the pipeline and under-utilized resources, and the second addressing these bottlenecks and increasing resource utilization. Note that at any given time there may be more than one bottleneck in the pipeline. For instance, the CPU might be idle as it waits to receive data from the network, and the GPU might be idle as it waits for the CPU to prepare the data for training. Additionally, different bottlenecks might pop up at different stages of the training. For example, the GPU might be fully utilized but idle only during iterations when a checkpoint is saved. Such bottlenecks, even if only periodic, could still potentially have a significant impact on the average throughput and should therefore be addressed.

Performance profiling is of particular importance as training resources are expensive, and if their utilization is not maximized, this increases developmental costs. Therefore, the aspects described herein review some of the potential bottlenecks in a training pipeline, and survey some of the tools for identifying these bottlenecks.

The Training Pipeline and Potential Bottlenecks

Figure 4:
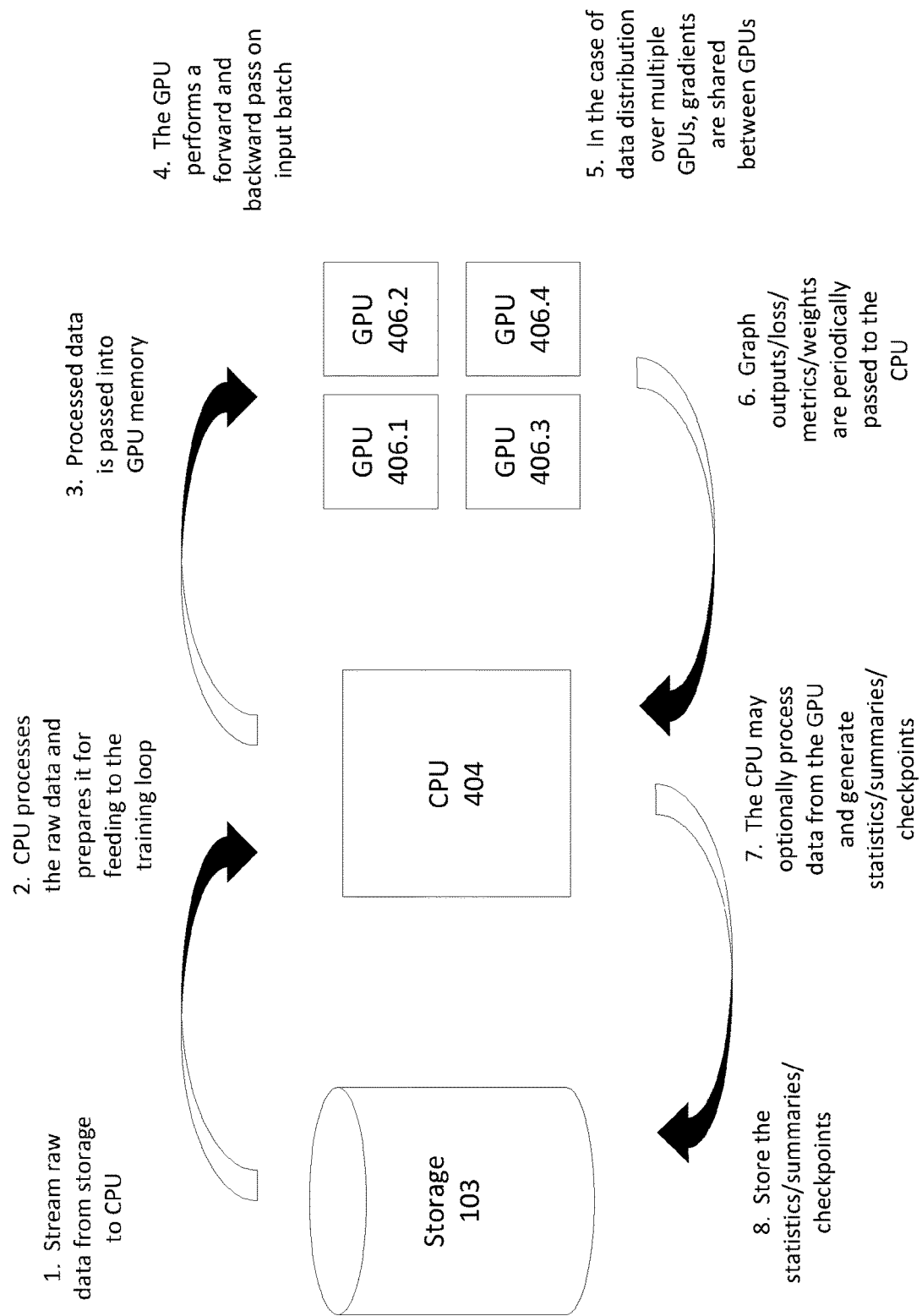
FIG. 4 illustrates additional details of the machine learning training flow associated with the preprocessing stage and the training and evaluation stage as shown in FIG. 2, in accordance with various aspects of the present disclosure.

FIG. 4 illustrates an example of a training flow, in accordance with one or more aspects of the present disclosure. The training flow 400 as shown in FIG. 4 may be identified with the preprocessing stage 204 and the training and evaluation stage 206 as shown and discussed above with reference to FIG. 2. To identify and explain possible sources of bottlenecks within a training session, FIG. 4 shows an example training pipeline with the training process broken down into eight stages. Any one of these steps may potentially impede the training flow. Again, for purposes of brevity, the training process is performed in this example on multiple GPUs 406.1-406.4, but it is assumed that a single CPU 404 is implemented.

Stage 1 as shown in FIG. 4 includes the streaming (i.e. loading) the raw data from storage (e.g. S3) to the CPU(s). This generally is the case unless the training data is automatically generated. The streaming or loading step may therefore include, for instance, loading training data from a local disk, over a suitable network location, from a remote storage location, etc. In any event, system resources are utilized in this stage that could potentially block the pipeline (e.g. the pipes 205.1-205.N as shown in FIG. 2). If the amount of raw data per training sample is particularly large, if the IO interface has high latency, or if the network bandwidth of the training instance is low, then the CPU 404 may be idle while awaiting for the raw data. An example of this is when training with Amazon SageMaker using "filemode," in which all of the training data is downloaded to a local disk before the training even starts. If there is a significant amount of data, this idle time may introduce a large delay with respect to the waiting times.

The alternative Amazon Sagemaker option is to use "pipemode," as discussed above, which allows streaming data directly from storage (e.g. S3) into the input data pipeline, thus avoiding the huge bottleneck to training startup. But even in the case of pipemode, resource limitations are still a concern. For example, if a particular instance type supports network IO of up to 10 Gigabits per second, and each sample requires 100 Megabits of raw data, an upper limit of 100 training samples per second will be reached irrespective of the speed of the GPUs 406.1-406.4. In an aspect, such issues may be overcome by reducing the amount of raw data, compressing some of the data, or choosing an instance type with a higher network IO bandwidth. In the example discussed herein, it is assumed that a limitation is associated with the network IO bandwidth of the instance, but such limitations could also be caused by a bandwidth limitation with respect to the amount of data that may be pulled from storage (e.g. S3), or from elsewhere along the line of loading data into the CPU 404.

With continued reference to FIG. 4, stage 2 in the training pipeline includes data pre-processing. This preprocessing stage may be identified, for example, with the preprocessing stage 204 as shown and described above with reference to FIG. 2. In this stage, which is performed by the CPU 404 in this example, the raw data is prepared for entry to the training loop. This might include applying augmentations to input data, inserting masking elements, batching, filtering, etc. The TensorFlow.dataset functions include built-in functionality for parallelizing the processing operations within the CPU 404 (e.g. the num_parallel_calls argument in the tf.dataset.map routine), and also for running the CPU 404 in parallel with the GPUs 406.1-406.4 (e.g. tf.dataset.prefetch). However, if running heavy, or memory intensive computation are executed at this stage, the GPUs 406.1-406.4 may remain idle awaiting data input.

Stage 3 includes the transfer of data from the CPU 404 to the GPUs 406.1-406.4. This stage is implemented because, in most cases, the CPU 404 and the GPUs 406.1-406.4 use different memory, and the training samples need to be copied from CPU memory to GPU memory before the training loop can run. This stage can therefore also potentially result in a bottleneck, depending on the size of the data samples and the interface bandwidth. Therefore, aspects include holding off on casting to a higher bit representation (tf.cast( )) or decompressing bit masks (tf.one_hot) until after the data is copied to GPU memory (e.g. of the GPUs 406.1-406.4).

Stage 4 includes the GPU forward and backward training pipeline, which constitutes the heart of the training pipeline of the training flow 400. This stage is performed via the GPUs 406.1-406.4 and, because the GPUs 406.1-406.4 are the most expensive resource, it is preferred to have the GPSs 406.1-406.4 as active as possible (i.e. constantly or close to constantly) and run at peak performance. In most cases, the average throughput, in number of samples trained per second, increases as the batch size is increased, so aspects include increasing the batch size to match the memory capacity of the GPUs 406.1-406.4 or within a threshold of matching the GPUs memory capacity (e.g. 99%, 95%, 90%, etc.).

The throughput of stage 4 is a function of the model architecture and loss function. In various aspects, techniques for reducing the computation include a preference of cony layers over dense layers, replacing large convolutions with a series of smaller ones with the same receptive field, using low precision or mixed precision variable types, consideration of using TensorFlow native functions instead tf.py_func, preference of tf.where over tf.cond, researching how a model and layer settings, such as memory layout (channels first or last), and memory alignment (layer input and output size, number of channels, shapes of convolutional filters, etc.) impact GPU performance and design the model accordingly, and a customization of the graph optimization (See https://www.TensorFlow.org/guide/graph_optimization).

Stage 5 is optional, and may be performed when distributed training is executed on multiple GPUs, either on a single training instance or on multiple instances. When present, this stage can also potentially introduce a bottleneck. For instance, during distributed training, each GPU 406.1-406.4 collects the gradients from all other GPUs. Depending on the distribution strategy, the number and size of the gradients, and the bandwidth of the communication channel between GPUs 406.1-406.4, a GPU may also be idle while collecting the gradient data. To solve such issues, the bit precision of the gradients may be reduced and/or the communication channel tuned, or other distribution strategies may be implemented.

Stage 6 includes the transfer of data from the GPUs 406.1-406.4 to the CPU 404. That is, during training, the GPUs 406.1-406.4 will return data to the CPU 404. Typically, this includes the loss and metric results, but may periodically also include more memory-intensive output tensors or model weights. As before, this data transfer can potentially introduce a bottleneck at certain phases of the training, depending on the size of the data and the interface bandwidth.

Stage 7 includes model output processing. In this stage, the CPU 404 may, for instance, perform processing on the output data received from the GPUs 406.1-406.4. This processing typically occurs within TensorFlow callbacks (see https://www.TensorFlow.org/api_docs/python/tf/keras/callbacks/Callback). These can be used to evaluate tensors, create image summaries, collect statistics, update the learning rate and more. There are different ways in which this may reduce the training throughput. First, if the processing is computation- or memory-intensive, this may become a performance bottleneck. If the processing is independent of the model GPU state, it is preferable to try running in a separate (non-blocking) thread. Second, running a large number of callbacks could also bottleneck the pipeline. One consideration is to combine the callbacks into a smaller number. Third, if the callbacks are processing output on each iteration, it is likely to be slowing down the throughput. In such a case, consideration should be given to reducing the frequency of the processing, or adding the processing to the GPU model graph (e.g. using custom TensorFlow metrics (See haps://www.TensorFlow.org/api_docs/python/tf/keras/metrics/Metric).

Stage 8 include the CPU 404 to data storage 103 transfer. For instance, during the training the CPU 404 may periodically transfer event files, log files, or model checkpoints to storage. Again, a large quantity of data combined with a limited IO bandwidth could potentially lead to latency in the training pipeline. And, even if care is taken to make the data transfer non-blocking (e.g. using dedicated CPU threads), network input and output channels may be used that share the same limited bandwidth (as on Amazon SageMaker instances). In this case, the amount of raw training data being fed on the network input could drop. One way this could happen is if all of TensorFlow summaries are collected in a single event file, which grows and grows during the course of the training. Then, each time the event file is uploaded to storage (e.g. S3), the amount of data passing on the network increases. When the file becomes very large, the data upload can interfere with the training.

Performance Analysis Tools

Now that issues with respect to bottlenecks have been described with respect to the various stages of training, some of the tools and techniques for identifying and analyzing these bottlenecks are provided below.

Instance Metrics

Figure 5:
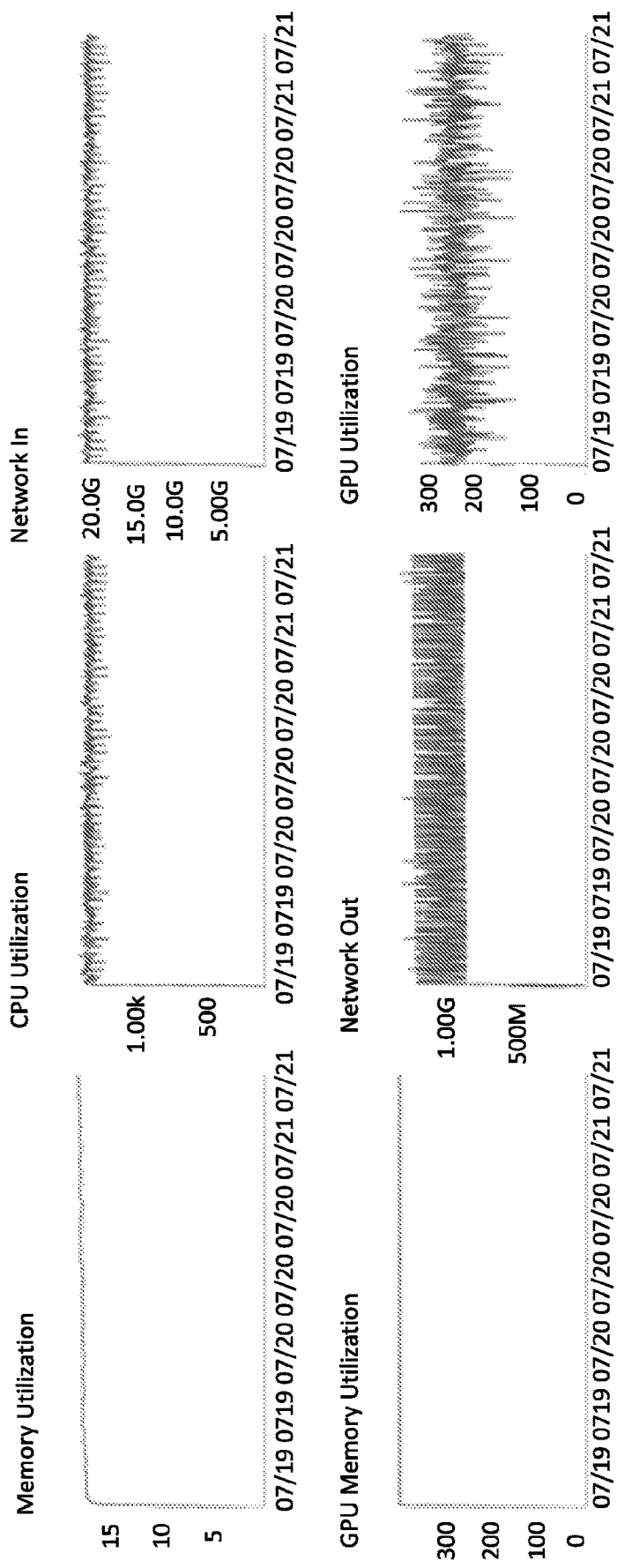
FIG. 5 illustrates a monitor page used to display such metrics for Sagemaker, in accordance with various aspects of the present disclosure.

Containing the previous example using Sagemaker, an assessment of how the resources of the training instance are being utilized may be performed. To do so, in Amazon SageMaker these are provided as "Instance Metrics," which are displayed in the "Monitor" section of the training job page, as well as in Amazon SageMaker Studio. An example of a Monitor page, which may be used to display such metrics for Sagemaker, is shown in FIG. 5. As shown in FIG. 5, the instance metrics in the Sagemaker example include graphs of the memory utilization, CPU utilization, network in, network out, GPU memory utilization, GPU utilization, and disk utilization, in which measurements are displayed at five minute intervals. Users can utilize these metrics to ensure that the trading process is running as expected and to get a "high level" (i.e. because of the relatively infrequent measurements) indication of what can be improved. For example, one can use these metrics to verify that the GPUs 406.1-406.4 are used for execution, and to assess how well the GPUs 406.1-406.4 are in act being used in this manner.

In addition, one can identify anomalies in the different metrics such as dips in the CPU/GPU utilization (which could indicate a bottleneck), rising CPU memory (which could indicate a memory leak), a choppy network (which could indicate an issue with how data is pulled from S3), whether the network in at maximum capacity (when compared to the training instance properties (https://aws.amazon.com/sagemaker/pricing/instance-types/)), which could indicate a bottleneck on the input pipeline, a rising network out (which could indicate that a single file is uploading that keeps growing instead of uploading small files), a delay in GPU start time (which could indicate a lengthy model compilation period), etc.

In an aspect, to configure TensorFlow to use only the memory it actually needs, the example lines of code below may be implemented.

```
gpus = tf.config.experimental.list_physical_devices('GPU')
for gpu in gpus:
    tf.config.experimental.set_memory_growth(gpu, True)
```

With respect to the metrics provided via Sagemaker, users may zoom in to specific intervals of the training, decrease the measurement intervals (to one minute), and display multiple metrics on a single graph. SageMaker allows one to create custom metrics as well (See Sagemaker documentation (https://docs.aws.amazon.com/sagemaker/latest/dg/automatic-model-tuning-define-metrics.html). However, such methods of performance analysis leaves much to be desired. For example, aside from the infrequency of the measurements and the unreliability of the GPU memory metric, little information is provided regarding which parts of code require improvement. As an illustrative example, an underutilized GPU could stem from a low batch size or from a bottleneck, and a highly utilized GPU may be the result of an inefficient loss function.

Therefore, the aspects described herein are directed to obtaining additional information that Sagemaker provides, as well as additional means by which to obtain metrics regardless of the particular training utility that is used (e.g., other than Sagemaker). As an example, if a training instance is being executed outside of the SageMaker service, the "instance metrics" are to be collected, which may be performed using off-the-shelf system profilers. In a Linux environment, command line tools such as nmon, perf, strace, top, and iotop may be used for this purpose. As another example, if an NVIDIA® GPU is being implemented, nvidia-smi (with the −1 flag) may be used for this purpose.

Performance Profilers

In an aspect, a performance profiler may be implemented to provide a more in depth picture of how the different stages of a training session are performing. Various profilers are available for different development frameworks. Performance profilers typically provide multiple graphs, which can be very useful in evaluating resource utilization, identifying bottlenecks and improving model performance TensorFlow offers the TensorFlow Profiler (https://www.TensorFlow.org/guide/profiler) for profiling tf models. When training with tf.keras.model.fit( ), profiling may be integrated by using the TensorBoard Keras Callback (https://www.TensorFlow.org/api_docs/python/tf/keras/callbacks/TensorBoard) as follows:

tbc=tf.keras.callbacks.TensorBoard(log_dir='/tmp/tb', profile_batch='20, 23')

In this example, the result if capturing statistics on iterations 20 to 23 and saving them to a file that can be opened and analyzed in TensorBoard (the size of the interval impacts the amount of data captured). Note that the TensorFlow Profiler callback is limited, however, in that it runs on a range of iterations, not on the whole training session. This means that to evaluate specific iterations (e.g. iterations where we save checkpoints) or to get a sense of how performance changes over time, different profiling sessions need to be run and comparisons made among them. Alternatively, more advanced profiling APIs may be implemented, allowing for the collection of statistics more freely.

To identify how training performs, there are several different techniques. Examples include the following:

Training with different batch sizes to test the maximum GPU memory capacity and assess the impact on GPU utilization;

Looping on the training dataset without performing training as described herein (See https://medium.com/@julsimon/deep-dive-on-TensorFlow-training-with-amazon-sagemaker-and-amazon-s3-12038828075c) to measure the maximum throughput of the input pipeline;

Training with generated data to assess the maximum GPU throughput;

Adding or removing different parts of the pre-processing pipeline to evaluate their impact on throughput;

Training with different, simple and complex loss functions to evaluate the impact of the loss function on throughput;

Training with and without callbacks;

Evaluating the impact of specific functions, replace them with simple dummy functions to assess impact.

Adding prints (e.g. using tf.print( )) and timers (e.g. tf.timestamp( )) to evaluate the performance of different blocks of code.

Information-Interference Trade-Off

The information-interference trade-off refers to the simple observation that the more the original pipeline is changed to extract meaningful performance data, the less meaningful that data actually is. The more the frequency is increased to poll the system for utilization metrics, the more the activity of the actual profiling begins to overshadow the activity of the training loop, essentially deeming the captured data useless. Finding the right balance is not always so easy. A complete performance analysis strategy should include profiling at different levels of invasion to get as clear a picture as possible of what is going on.

Case Study

In this section, an illustrative example is provided to demonstrate some of the potential performance issues discussed in practice. Many of the examples shown herein were inspired by real issues encountered during training on AWS. For each example, it is further demonstrated how to identify the performance issues by selecting and analyzing some of the profiling measurements.

The model used in this example is a deep convolutional network that learns to perform pixel level segmentation on an input image. The base model parallelizes the CPU and GPU processing and runs with a batch size of 64. In this case, the training throughput is roughly 100 samples per second. The SageMaker dashboard reports GPU memory utilization of 98% and GPU utilization of between 95% and 100%.

Figure 6:
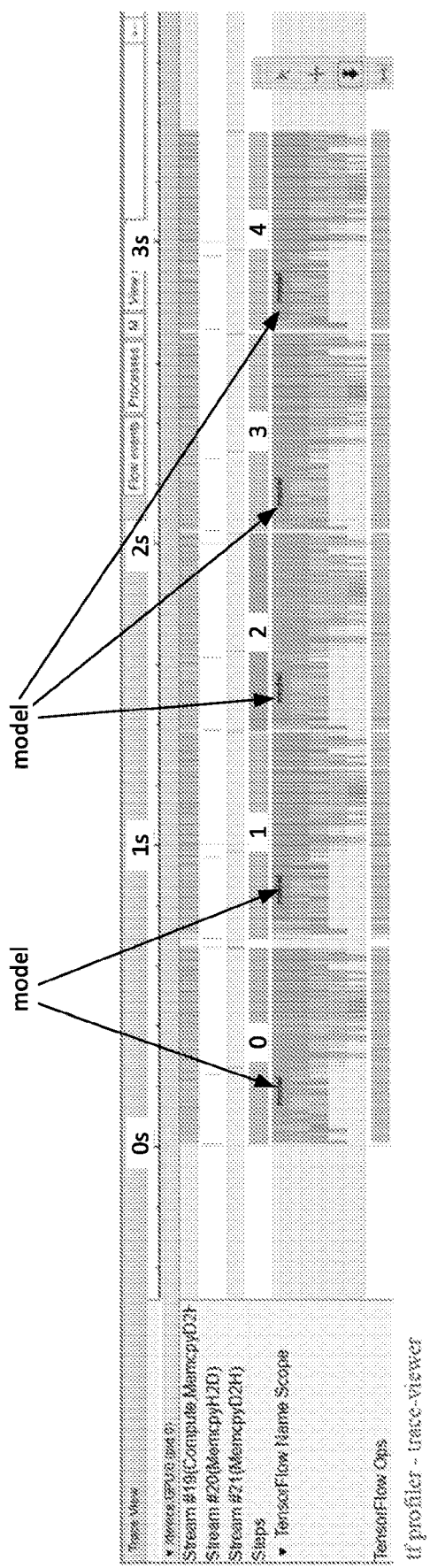
FIG. 6 illustrates the efficiency of GPU utilization using trace_viewer of a tf profiler, in accordance with various aspects of the present disclosure.

The efficiency of the GPU utilization can also be seen from the trace_viewer of the tf profiler shown in FIG. 6, in which it is illustrated that the GPU is almost always active. Recall that the tf profile was configured to run for five steps, steps 20-24. For the sake of comparison, it is also noted that the Instance Metrics reports network-in of 14.9 GBytes per minute, and network-out of under 100 MBytes per minute.

Small Batch Size

To evaluate the impact of the batch size on the performance, the batch size was reduced to 2, leaving all other model properties unchanged. As a result, the throughput drops to 40 samples per second (not shown). The effect on GPU utilization and GPU memory utilization is immediately noticeable from the "instance metrics" in which a significant drop is observed, down to around 60% and 23%, respectively (not shown). Naturally, each iteration takes a lot less time, but the percentage of the time during which the GPU is active is much lower.

Figure 7:
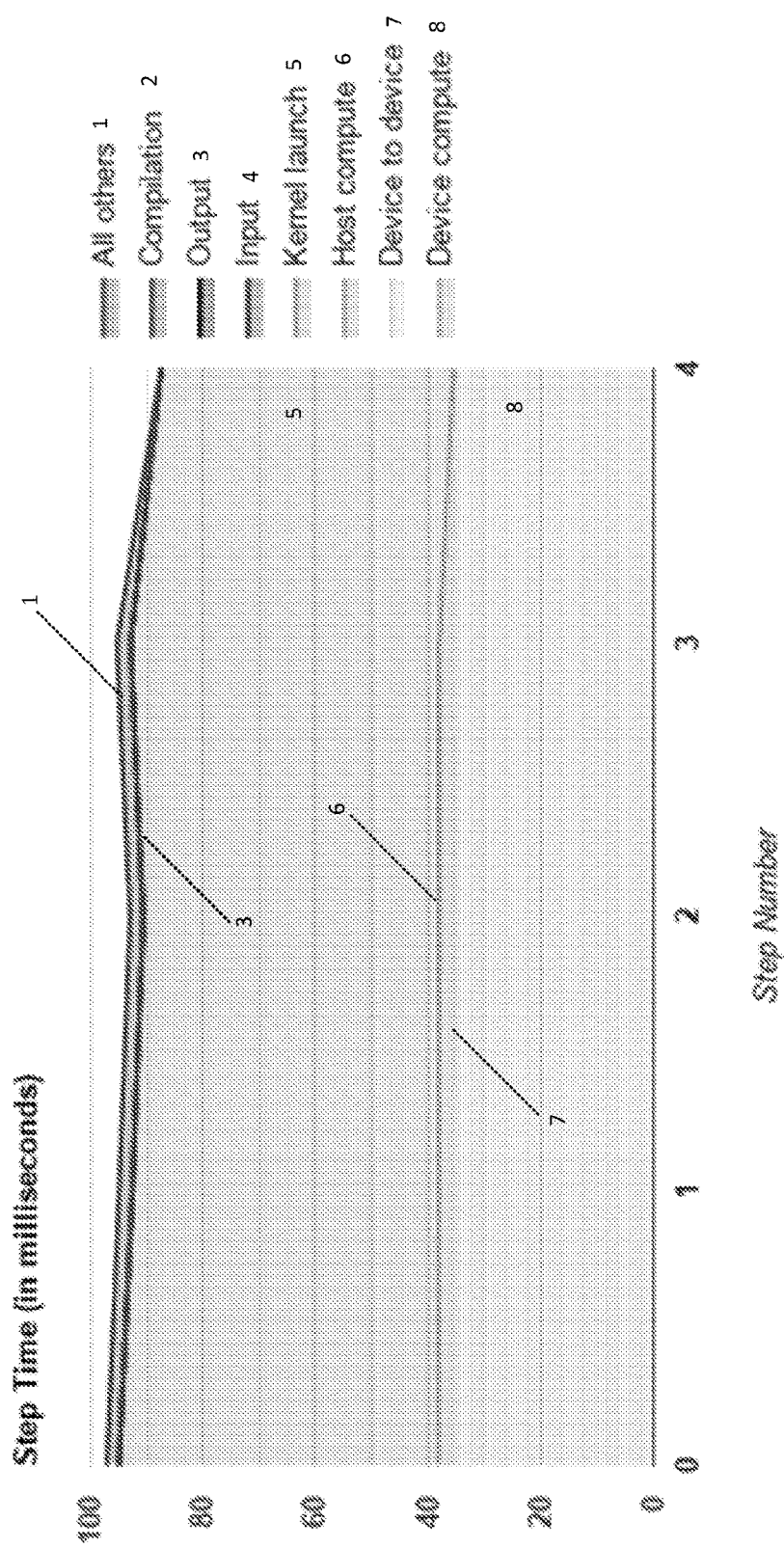
FIG. 7 illustrates an example tf profiler step time graph, in accordance with various aspects of the present disclosure.
Figure 8:
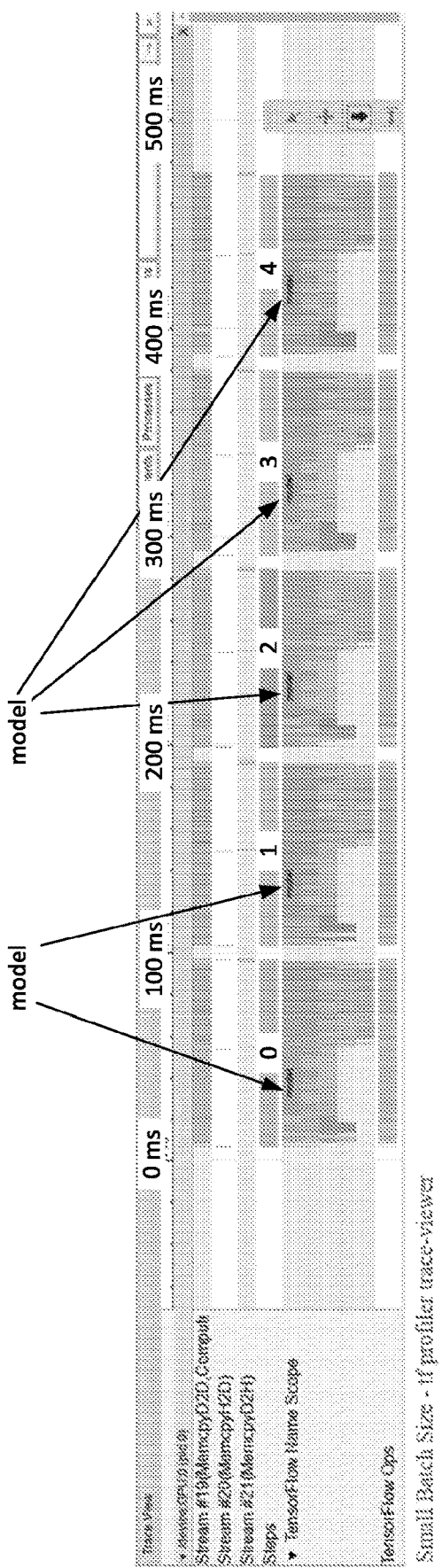
FIG. 8 illustrates an example trace_viewer indicating that tf ops are sparsely scattered across the computation block of each step, in accordance with various aspects of the present disclosure.

The tf profiler step time graph as shown in FIG. 7 shows that the small batch size leads to over half the time being spent loading kernels to the GPU. The trace_viewer as shown in FIG. 8 shows that, while the GPU remains unblocked by the input, the tf ops appear to be sparsely scattered across the computation block of each step.

Network Input Bottleneck

In this example, a network bottleneck is artificially introduces on the network input. This is done by dropping every 9 out 10 input records so that 10 times as much input data is required on the network to maintain the same throughput. An example of the code used to perform this artificial network input increase is shown below.

```
# id generator
def id_gen( ):
    e = 0
    while True:
        yield e
        e += 1
# enter id to feature dict
def add_id_label(f, i):
    f['id'] = i
    return f
# create a dataset of indices and zip it with input dataset
ids = tf.data.Dataset.from_generator(id_gen, tf.int64)
```

-continued

```
ds = tf.data.Dataset.zip((ds, ids))
# enter id to feature dict
ds = ds.map(add_id_label, num_parallel_calls=
tf.data.experimental.autotune)
# filter out every 99 out of 100 records
ds = ds.filter(lambda f: tf.squeeze(tf.equal(tf.math.floormod(f['id'],10),0)))
```

Figure 9:
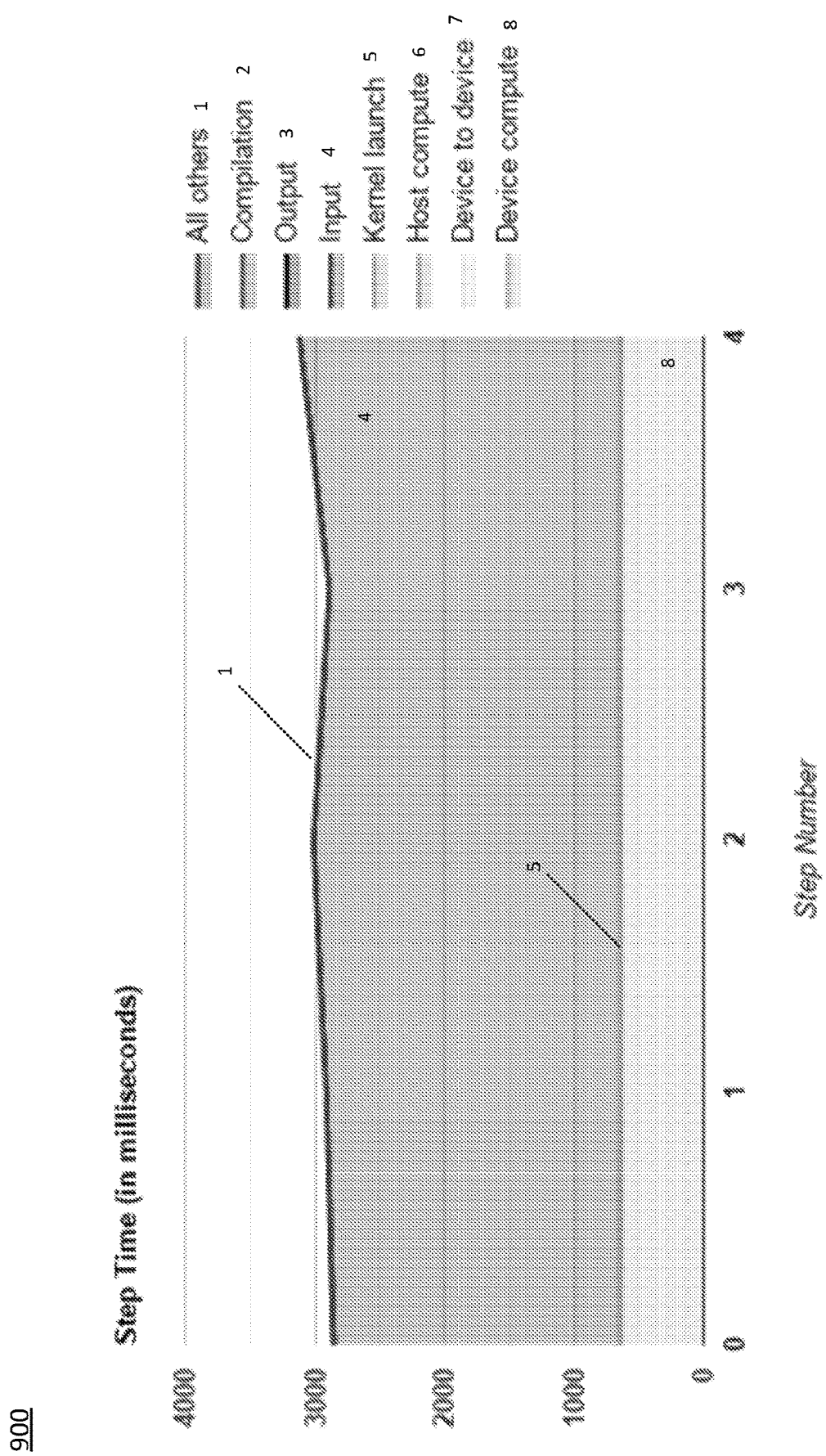
FIG. 9 illustrates another example tf profiler step time graph, in accordance with various aspects of the present disclosure.
Figure 10:
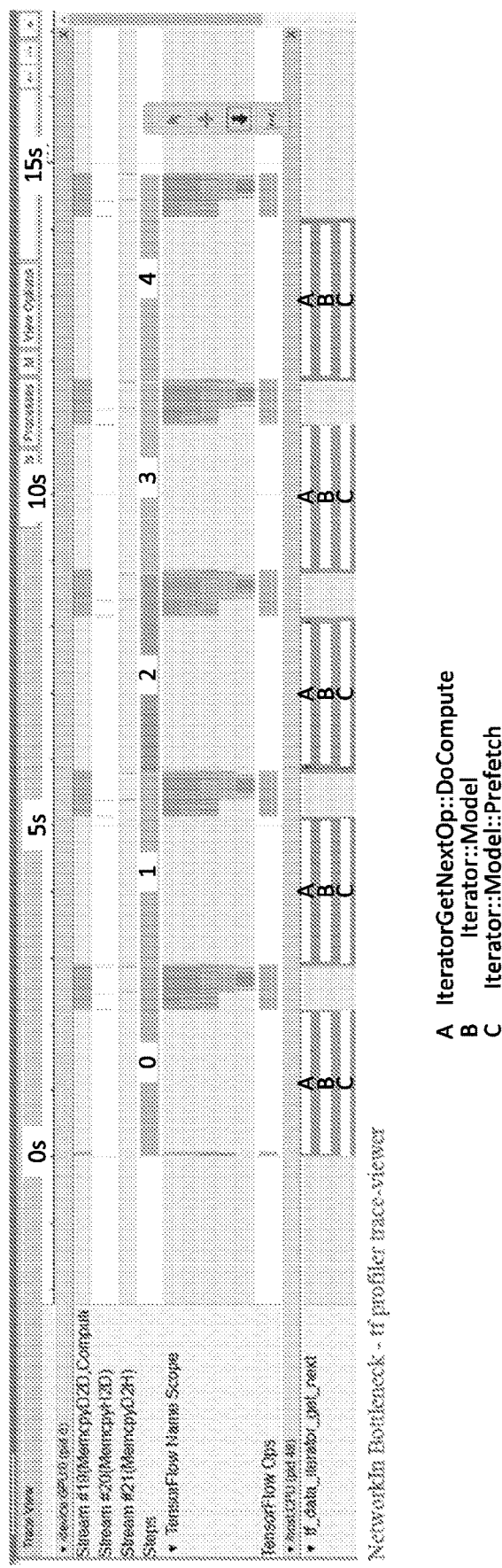
FIG. 10 illustrates an example trace_viewer showing the GPU sitting idle for the majority of each step while waiting for data from the tf_data_iterator_get_next op, in accordance with various aspects of the present disclosure.

From the instance metrics (not shown) it may be observed that the network-in caps out at 33.4 GBytes per minute, which is only slightly more than twice the volume of the normal run (14.9 GBytes) despite the fact that ten times as much data is needed. The throughput also drops to 22 samples per second. Unsurprisingly, the program is highly input bound. The tf profiler as shown in FIG. 9 reports that, of the total step time, 77.8% is spent waiting for data. Moreover, the trace_viewer as shown in FIG. 10 clearly shows the GPU sitting idle for the majority of each step as it waits for data from the tf_data_iterator_get_next op.

Overloaded Pre-Processing Pipeline

TensorFlow offers ways to maximize the parallelization of the data processing (as demonstrated in the TensorBoard Profiler Tutorial (https://www.TensorFlow.org/tensorboard/tensorboard_profiling_keras)), but this does not eliminate the need to optimize the input data processing pipeline. For example, if data processing is resource intensive, it may impact the performance of the model, and thus one may consider moving some of the processing offline. If the heavy operation is GPU friendly, (e.g. a large convolution), it may also be advisable to consider performing the operation on the GPU using the experimental map_on_gpu (https://github.com/TensorFlow/TensorFlow/blob/r2.2/TensorFlow/python/data/experimental/ops/prefetching_ops.py#L260) function, bearing in mind the overhead of the data transfer.

Figure 11:
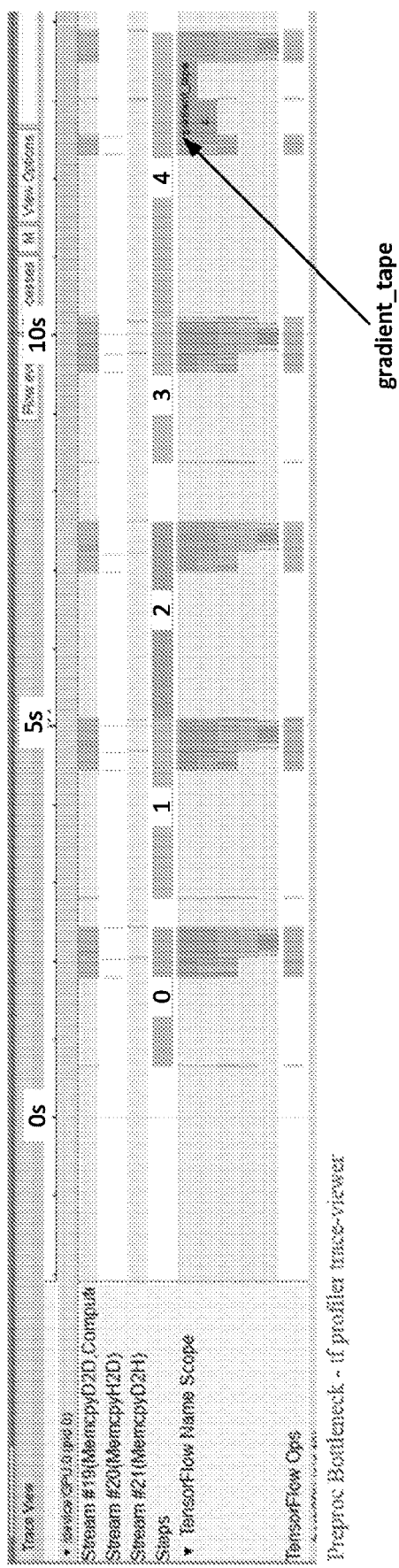
FIG. 11 illustrates an example tf prolfiler trace-viewer indicating a drop in throughput, in accordance with various aspects of the present disclosure.

In this example, an overloaded pre-processing pipeline is simulated by applying a separable_conv2d (haps://www-.TensorFlow.org/api_docs/python/tf/nn/separable_conv2d) with filter size 7×7 to the input frame. The throughput drops to just 25 samples per second, and the maximum GPU utilization to 36%, as observed via the tf prolfiler trace-viewer in FIG. 11 (details omitted). The CPU utilization, on the other hand, jumps from 66% to 96%. Once again, the program is highly input bound, and the trace-viewer shows large chunks of GPU idle time. Careful analysis of the CPU section of the trace-viewer, (not shown), shows that separable convolution taking up large chunks of the computation.

Bottleneck on the CPU-GPU Data Interface

Figure 12:
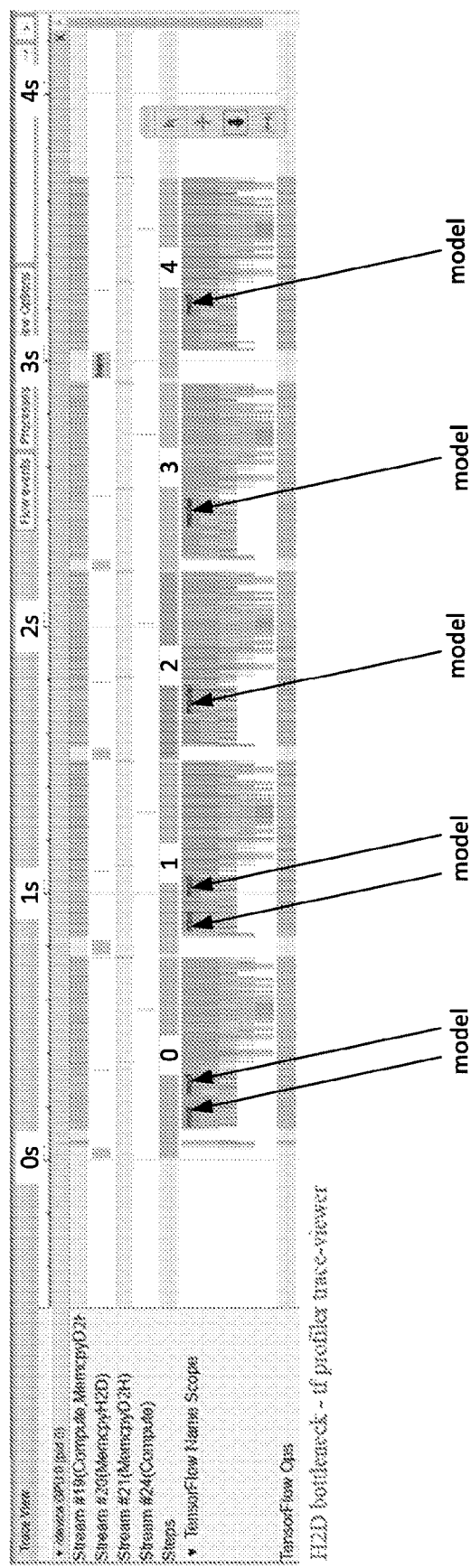
FIG. 12 illustrates an example tf prolfiler trace-viewer indicating a drop in throughput, in accordance with various aspects of the present disclosure.

In this example, the input data being passed to the GPU is artificially increased by blowing up the size of the input frame by a factor of 10. On the CPU side, this is done by replicating the input frame 10 times (using tf.tile( )). On the GPU side, this is done by receiving the enlarged input frame, but immediately discarding the added data. As shown in FIG. 12, the throughput in this case drops to 84 samples per second, and the bottleneck is clearly evident on the trace-viewer. Notice how, for each step, the size of the block of Stream #20(MemcpyH2D) has grown, and how the GPU compute remains idle until the block has completed.

Inefficiency in the GPU(s)

Figure 13:
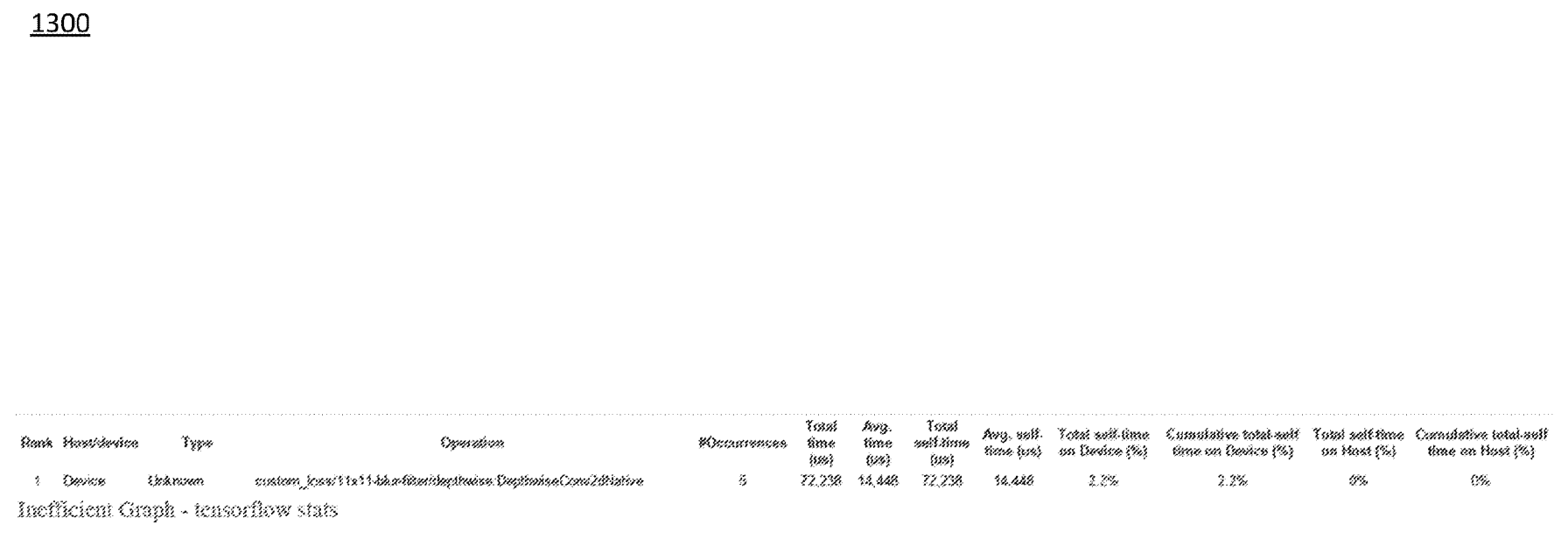

In this example, the impact of an inefficient GPU is simulated by applying an 11×11 convolution filter to the output of the model before calculating the loss function. Unsurprisingly, the throughput drops slightly, to 96 samples per second. The impact on the graph can be viewed on the tf profiler TensorFlow stats page, where it is observed that the added operation becomes the most time-consuming operation in the GPU. Table 1300 as shown in FIG. 13 provides information on the heaviest operations, which we can then be used to improve the model performance.

Heavy Post Processing

In this example, a callback function is added that simulates processing the segmentation masks that are output by the model, by creating and 64 random images after every iteration. Doing so results in TensorFlow printing the following warning:

WARNING:TensorFlow:Method (on_train_batch_end) is slow compared to the batch update (0.814319). Check your callbacks.

Figure 14:
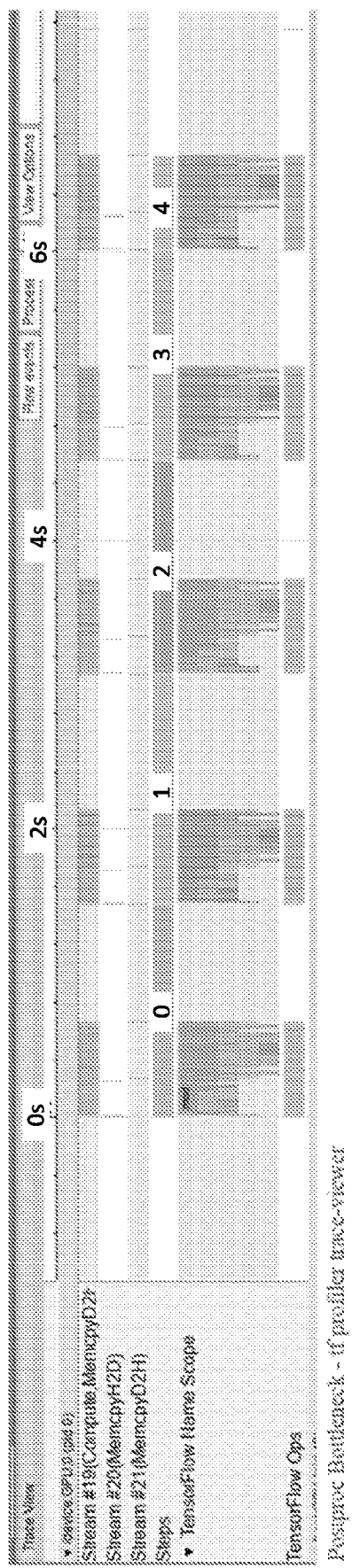
FIG. 14 illustrates an example tf prolfiler trace-viewer indicating a drop in GPU utilization, in accordance with various aspects of the present disclosure.

Additionally, the throughput drops to 43 samples per second, the GPU utilization drops to 46%, and tf profiler as shown in FIG. 14 reports that the GPU is active for only 47% of each time step. The bottleneck is clearly seen on the trace-viewer 1400, in which it is shown that the GPU idle for the second half of each step.

Examples

The following examples pertain to further aspects

Example 1 is a machine learning model training system, comprising: one or more processors; and a memory configured to store instructions that, when executed by the one or more processors, cause the one or more processors to: receive labeled training data from a data storage; transform the labeled training data to a record file format to generate transformed record file data; and perform, via a machine learning training utility, training and evaluation of the transformed record file data to generate a machine learning trained model that enables machine vision to recognize and classify objects included in a road scene, wherein a first level of data shuffling is performed on the received labeled training data to generate the transformed record file data, and wherein a second level of data shuffling is performed on the transformed record file data at the file level during the training and evaluation of the transformed record file data to generate the machine learning trained model In Example 2, the subject matter of Example 1, wherein the one or more processors are configured to perform the first level of data shuffling by parsing the received labeled training data to generate recorded labeled training data.

In Example 3, the subject matter of any combination of Examples 1-2, wherein the one or more processors are configured to perform the first level of data shuffling by randomly grouping the recorded labeled training data into predetermined target file sizes and predetermined file formats to generate the transformed record file data.

In Example 4, the subject matter of any combination of Examples 1-3, wherein the predetermined target file size is 100 megabytes, and wherein the predetermined file format is a TFRecord file format.

In Example 5, the subject matter of any combination of Examples 1-4, wherein the one or more processors are configured to perform the second level of data shuffling by executing a TensorFlow dataset shuffle function on the transformed record file data at the file level.

In Example 6, the subject matter of any combination of Examples 1-5, wherein the one or more processors are configured to perform training and evaluation of the transformed record file data via a training environment, and to utilize a pipe mode to receive the transformed record file data via a data pipe stream that decouples the data storage from the training environment.

In Example 7, the subject matter of any combination of Examples 1-6, wherein the data pipe stream comprises a plurality of data pipes, and wherein the one or more processors are configured to identify under-represented transformed record file data based upon the training and evaluation of the transformed record file data via the training environment, and to utilize at least one of the plurality of data pipes as a dedicated data pipe to provide the under-represented transformed record file data for the training and evaluation of the transformed record file data in a subsequent iteration through the training environment.

In Example 8, the subject matter of any combination of Examples 1-7, wherein the one or more processors are configured to perform a third level of data shuffling with respect to an order of the transformed record file data in the data pipe stream prior to the training and evaluation of the transformed record file data via the training environment.

In Example 9, the subject matter of any combination of Examples 1-8, wherein the one or more processors are configured to perform the third level of data shuffling as part of a preprocessing stage that utilizes a Sagemaker ShuffleConfig class.

In Example 10, the subject matter of any combination of Examples 1-9, wherein the one or more processors are configured to perform training and evaluation of the transformed record file data via a training environment, and to utilize one or more of the following to receive the transformed record file data: TFRecordDatasets pointing directly to files in the data storage; parsing of the transformed record file data; downloading of the transformed record file data directly from the data storage; and downloading of the transformed record file data via a managed third-party file system solution.

Example 11 is a non-transitory computer-readable medium having instructions stored thereon that, when executed by one or more processors, cause the one or more processors to: receive labeled training data from a data storage; transform the labeled training data to a record file format to generate transformed record file data; and perform, via a machine learning training utility, training and evaluation of the transformed record file data to generate a machine learning trained model that enables machine vision to recognize and classify objects included in a road scene, wherein a first level of data shuffling is performed on the received labeled training data to generate the transformed record file data, and wherein a second level of data shuffling is performed on the transformed record file data at the file level during the training and evaluation of the transformed record file data to generate the machine learning trained model.

In Example 12, the subject matter of any combination of Example 11, wherein the instructions further cause the one or more processors to perform the first level of data shuffling by parsing the received labeled training data to generate recorded labeled training data.

In Example 13, the subject matter of any combination of Examples 11-12, wherein the instructions further cause the one or more processors to perform the first level of data shuffling by randomly grouping the recorded labeled training data into predetermined target file sizes and predetermined file formats to generate the transformed record file data.

In Example 14, the subject matter of any combination of Examples 11-13, wherein the predetermined target file size is 100 megabytes, and wherein the predetermined file format is a TFRecord file format.

In Example 15, the subject matter of any combination of Examples 11-14, wherein the instructions further cause the one or more processors to perform the second level of data shuffling by executing a TensorFlow dataset shuffle function on the transformed record file data at the file level.

In Example 16, the subject matter of any combination of Examples 11-15, wherein the instructions further cause the one or more processors to perform training and evaluation of the transformed record file data via a training environment, and to utilize a pipe mode to receive the transformed record file data via a data pipe stream that decouples the data storage from the training environment.

In Example 17, the subject matter of any combination of Examples 11-16, wherein the data pipe stream comprises a plurality of data pipes, and wherein the instructions further cause the one or more processors to identify under-represented transformed record file data based upon the training and evaluation of the transformed record file data via the training environment, and to utilize at least one of the plurality of data pipes as a dedicated data pipe to provide the under-represented transformed record file data for the training and evaluation of the transformed record file data in a subsequent iteration through the training environment.

In Example 18, the subject matter of any combination of Examples 11-17, wherein the instructions further cause the one or more processors to perform a third level of data shuffling with respect to an order of the transformed record file data in the data pipe stream prior to the training and evaluation of the transformed record file data via the training environment.

In Example 19, the subject matter of any combination of Examples 11-18, wherein the instructions further cause the one or more processors to perform the third level of data shuffling as part of a preprocessing stage that utilizes a Sagemaker ShuffleConfig class.

In Example 20, the subject matter of any combination of Examples 11-19, wherein the instructions further cause the one or more processors to perform training and evaluation of the transformed record file data via a training environment, and to utilize one or more of the following to receive the transformed record file data: TFRecordDatasets pointing directly to files in the data storage; parsing of the transformed record file data; downloading of the transformed record file data directly from the data storage; and downloading of the transformed record file data via a managed third-party file system solution.

Example 21 is a machine learning model training system, comprising: one or more processing means; and a memory means for storing instructions that, when executed by the one or more processing means, cause the one or more processing means to: receive labeled training data from a data storage; transform the labeled training data to a record file format to generate transformed record file data; and perform, via a machine learning training utility, training and evaluation of the transformed record file data to generate a machine learning trained model that enables machine vision to recognize and classify objects included in a road scene, wherein a first level of data shuffling is performed on the received labeled training data to generate the transformed record file data, and wherein a second level of data shuffling is performed on the transformed record file data at the file level during the training and evaluation of the transformed record file data to generate the machine learning trained model In Example 22, the subject matter of Example 21, wherein the one or more processing means perform the first level of data shuffling by parsing the received labeled training data to generate recorded labeled training data.

In Example 23, the subject matter of any combination of Examples 21-22, wherein the one or more processing means perform the first level of data shuffling by randomly grouping the recorded labeled training data into predetermined target file sizes and predetermined file formats to generate the transformed record file data.

In Example 24, the subject matter of any combination of Examples 21-23, wherein the predetermined target file size is 100 megabytes, and wherein the predetermined file format is a TFRecord file format.

In Example 25, the subject matter of any combination of Examples 21-24, wherein the one or more processing means perform the second level of data shuffling by executing a TensorFlow dataset shuffle function on the transformed record file data at the file level.

In Example 26, the subject matter of any combination of Examples 21-25, wherein the one or more processing means perform training and evaluation of the transformed record file data via a training environment, and to utilize a pipe mode to receive the transformed record file data via a data pipe stream that decouples the data storage from the training environment.

In Example 27, the subject matter of any combination of Examples 21-26, wherein the data pipe stream comprises a plurality of data pipes, and wherein the one or more processing means identify under-represented transformed record file data based upon the training and evaluation of the transformed record file data via the training environment, and utilize at least one of the plurality of data pipes as a dedicated data pipe to provide the under-represented transformed record file data for the training and evaluation of the transformed record file data in a subsequent iteration through the training environment.

In Example 28, the subject matter of any combination of Examples 21-27, wherein the one or more processing means perform a third level of data shuffling with respect to an order of the transformed record file data in the data pipe stream prior to the training and evaluation of the transformed record file data via the training environment.

In Example 29, the subject matter of any combination of Examples 21-28, wherein the one or more processing means perform the third level of data shuffling as part of a preprocessing stage that utilizes a Sagemaker ShuffleConfig class.

In Example 30, the subject matter of any combination of Examples 21-29, wherein the one or more processing means perform training and evaluation of the transformed record file data via a training environment, and utilize one or more of the following to receive the transformed record file data: TFRecordDatasets pointing directly to files in the data storage; parsing of the transformed record file data; downloading of the transformed record file data directly from the data storage; and downloading of the transformed record file data via a managed third-party file system solution.

Example 31 is a non-transitory computer-readable medium having instructions stored thereon that, when executed by one or more processing means, cause the one or more processing means to: receive labeled training data from a data storage; transform the labeled training data to a record file format to generate transformed record file data; and perform, via a machine learning training utility, training and evaluation of the transformed record file data to generate a machine learning trained model that enables machine vision to recognize and classify objects included in a road scene, wherein a first level of data shuffling is performed on the received labeled training data to generate the transformed record file data, and wherein a second level of data shuffling is performed on the transformed record file data at the file level during the training and evaluation of the transformed record file data to generate the machine learning trained model.

In Example 32, the subject matter of any combination of Example 31, wherein the instructions further cause the one or more processing means to perform the first level of data shuffling by parsing the received labeled training data to generate recorded labeled training data.

In Example 33, the subject matter of any combination of Examples 31-32, wherein the instructions further cause the one or more processing means to perform the first level of data shuffling by randomly grouping the recorded labeled training data into predetermined target file sizes and predetermined file formats to generate the transformed record file data.

In Example 34, the subject matter of any combination of Examples 31-33, wherein the predetermined target file size is 100 megabytes, and wherein the predetermined file format is a TFRecord file format.

In Example 35, the subject matter of any combination of Examples 31-34, wherein the instructions further cause the one or more processing means to perform the second level of data shuffling by executing a TensorFlow dataset shuffle function on the transformed record file data at the file level.

In Example 36, the subject matter of any combination of Examples 31-35, wherein the instructions further cause the one or more processing means to perform training and evaluation of the transformed record file data via a training environment, and to utilize a pipe mode to receive the transformed record file data via a data pipe stream that decouples the data storage from the training environment.

In Example 37, the subject matter of any combination of Examples 31-36, wherein the data pipe stream comprises a plurality of data pipes, and wherein the instructions further cause the one or more processing means to identify under-represented transformed record file data based upon the training and evaluation of the transformed record file data via the training environment, and to utilize at least one of the plurality of data pipes as a dedicated data pipe to provide the under-represented transformed record file data for the training and evaluation of the transformed record file data in a subsequent iteration through the training environment.

In Example 38, the subject matter of any combination of Examples 31-37, wherein the instructions further cause the one or more processing means to perform a third level of data shuffling with respect to an order of the transformed record file data in the data pipe stream prior to the training and evaluation of the transformed record file data via the training environment.

In Example 39, the subject matter of any combination of Examples 31-38, wherein the instructions further cause the one or more processing means to perform the third level of data shuffling as part of a preprocessing stage that utilizes a Sagemaker ShuffleConfig class.

In Example 40, the subject matter of any combination of Examples 31-39, wherein the instructions further cause the one or more processing means to perform training and evaluation of the transformed record file data via a training environment, and to utilize one or more of the following to receive the transformed record file data: TFRecordDatasets pointing directly to files in the data storage; parsing of the transformed record file data; downloading of the transformed record file data directly from the data storage; and downloading of the transformed record file data via a managed third-party file system solution.

An apparatus as shown and described.

A method as shown and described.

CONCLUSION

The aforementioned description of the specific aspects will so fully reveal the general nature of the disclosure that others can, by applying knowledge within the skill of the art, readily modify and/or adapt for various applications such specific aspects, without undue experimentation, and without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one aspect," "an aspect," "an exemplary aspect," etc., indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

The exemplary aspects described herein are provided for illustrative purposes, and are not limiting. Other exemplary aspects are possible, and modifications may be made to the exemplary aspects. Therefore, the specification is not meant to limit the disclosure. Rather, the scope of the disclosure is defined only in accordance with the following claims and their equivalents.

Aspects may be implemented in hardware (e.g., circuits), firmware, software, or any combination thereof. Aspects may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

The word "exemplary" is used herein to mean "serving as an example, instance, or illustration". Any embodiment or design described herein as "exemplary" is not necessarily to be construed as preferred or advantageous over other embodiments or designs.

Throughout the drawings, it should be noted that like reference numbers are used to depict the same or similar elements, features, and structures, unless otherwise noted.

The terms "at least one" and "one or more" may be understood to include a numerical quantity greater than or equal to one (e.g., one, two, three, four, [ ... ], etc.). The term "a plurality" may be understood to include a numerical quantity greater than or equal to two (e.g., two, three, four, five, [ ... ], etc.).

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. The terms "group (of)", "set (of)", "collection (of)", "series (of)", "sequence (of)", "grouping (of)", etc., and the like in the description and in the claims, if any, refer to a quantity equal to or greater than one, i.e., one or more. The terms "proper subset", "reduced subset", and "lesser subset" refer to a subset of a set that is not equal to the set, illustratively, referring to a subset of a set that contains less elements than the set.

The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art.

The terms "processor" or "controller" as, for example, used herein may be understood as any kind of technological entity that allows handling of data. The data may be handled according to one or more specific functions executed by the processor or controller. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

As used herein, "memory" is understood as a computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, among others, or any combination thereof. Registers, shift registers, processor registers, data buffers, among others, are also embraced herein by the term memory. The term "software" refers to any type of executable instruction, including firmware.

In one or more of the exemplary aspects described herein, processing circuitry can include memory that stores data and/or instructions. The memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

A "vehicle" may be understood to include any type of driven object. By way of example, a vehicle may be a driven object with a combustion engine, a reaction engine, an electrically driven object, a hybrid driven object, or a combination thereof. A vehicle may be or may include an automobile, a bus, a mini bus, a van, a truck, a mobile home, a vehicle trailer, a motorcycle, a bicycle, a tricycle, a train locomotive, a train wagon, a moving robot, a personal transporter, a boat, a ship, a submersible, a submarine, a drone, an aircraft, a rocket, and the like.

A "ground vehicle" may be understood to include any type of vehicle, as described above, which is driven on the ground, e.g., on a street, on a road, on a track, on one or more rails, off-road, etc.

The term "autonomous vehicle" may describe a vehicle that implements all or substantially all navigational changes, at least during some (significant) part (spatial or temporal, e.g., in certain areas, or when ambient conditions are fair, or on highways, or above or below a certain speed) of some drives. Sometimes an "autonomous vehicle" is distinguished from a "partially autonomous vehicle" or a "semi-autonomous vehicle" to indicate that the vehicle is capable of implementing some (but not all) navigational changes, possibly at certain times, under certain conditions, or in certain areas. A navigational change may describe or include a change in one or more of steering, braking, or acceleration/deceleration of the vehicle. A vehicle may be described as autonomous even in case the vehicle is not fully automatic (for example, fully operational with driver or without driver input). Autonomous vehicles may include those vehicles that can operate under driver control during certain time periods and without driver control during other time periods. Autonomous vehicles may also include vehicles that control only some aspects of vehicle navigation, such as steering (e.g., to maintain a vehicle course between vehicle lane constraints) or some steering operations under certain circumstances (but not under all circumstances), but may leave other aspects of vehicle navigation to the driver (e.g., braking or braking under certain circumstances). Autonomous vehicles may also include vehicles that share the control of one or more aspects of vehicle navigation under certain circumstances (e.g., hands-on, such as responsive to a driver input) and vehicles that control one or more aspects of vehicle navigation under certain circumstances (e.g., hands-off, such as independent of driver input). Autonomous vehicles may also include vehicles that control one or more aspects of vehicle navigation under certain circumstances, such as under certain environmental conditions (e.g., spatial areas, roadway conditions). In some aspects, autonomous vehicles may handle some or all aspects of braking, speed control, velocity control, and/or steering of the vehicle. An autonomous vehicle may include those vehicles that can operate without a driver. The level of autonomy of a vehicle may be described or determined by the Society of Automotive Engineers (SAE) level of the vehicle (e.g., as defined by the SAE, for example in SAE J3016 2018: Taxonomy and definitions for terms related to driving automation systems for on road motor vehicles) or by other relevant professional organizations. The SAE level may have a value ranging from a minimum level, e.g. level 0 (illustratively, substantially no driving automation), to a maximum level, e.g. level 5 (illustratively, full driving automation).

APPENDIX

Working with TensorFlow—An Example Developmental Flow

This section is provided for additional clarity and to summarize the various issues that may be encountered while using TensorFlow for machine learning model training. This example developmental flow considers both a custom training loop and the use of high level APIs. In this scenario, the developmental flow example takes advantage of TensorFlow's high-level APIs, with the main considerations being feasibility, ease of development (e.g. high level options are easier to develop and offer many conveniences), and training speed. The example developmental flow described herein proceeds on the preference, whenever possible, to adapt to the high level APIs to rely on the built in optimizations and take advantage of the conveniences offered.

Note that in TensorFlow 2.2, an intermediate level of customization is introduced via the tf.keras.model train_step (https://www.tensorflow.org/api docs/python/tf/k:eras/Model#train step) and test_step (https://www.tensorflow.org/api_docs/python/tf/keras/Model#test_step) functions. This enables one to take advantage of the optimizations offered by the high level fit( ) routine while also inserting customization, which may be an appropriate option for some users. The benefits of the high level APIs used in this developmental example is described in the Keras (non tf) documentation here (https://keras.io/guides/customizing_what_happens in_fiti).

Choosing Between tf.keras.model or tf.estimator

It should be noted that the move from TensorFlow 1 to TensorFlow 2 introduces a considerable number of changes (see for example https://www.tensorflow.org/guide/migrate). One of the most significant changes is that TensorFlow 2 promotes the tf.keras API over the tf.estimator API, which was the prominent high level API in many of the tensorflow 1 releases. To make matters more complicated, the restrictions imposed by the tf.keras APIs appears to be greater than the restrictions imposed by the tf.estimator APIs.

In this developmental example flow, TensorFlow 2 and the keras APIs were chosen to take advantage of the most up-to-date optimizations and capabilities, with considerations given to the deployment process (DLO) requiring tf.keras.

Setting the Loss Function in tf.keras.model

Configuration of the training loss in tf.keras.model fit function, introduces how the high level API may seem to introduce restrictions on training setup. This developmental flow example provides three different ways to overcome these restrictions. Each technique has limitations, some of which are provided in further detail, so that one may be selected based upon specific development needs.

The standard way of configuring the loss function for training with the model.fit function is via the model.compile (https://www.tensorflow.org/api_docs/python/tf/keras/Model#compile) function, which allows one to enter one or more (or zero) losses through the loss argument. The problem is that the loss function must have the signature loss=fn (y_true, y_pred), where y_pred is one of the outputs of the model and y_true is its corresponding label coming from the training/evaluation dataset. This is great for standard loss functions that are clearly dependent on a single model output tensor and a single corresponding label tensor. And, in some instances, not only will the model conform to this standard, but one of the default losses provided by tf.keras.losses (https://www.tensorflow.org/api_docs/python/tf/k:eras/losses) may be utilized as well. However, this is typically not the case for most models or loss functions, as many times loss functions depend on multiple outputs and multiple labels, and tend to be a lot more complex that the default losses offered in the API.

Thus, one option is to abandon the default training step and implement a custom one. In this example, the default training loop was selected and three alternatives considered. The first is to Flatten and Concatenate. For this alternative, the first option is to modify the outputs and labels of the model in order to conform to the required signature. If the loss function must receive two tensors, y true and y pred, then all of the labels the loss function depends on are flattened and concatenated. And all of the outputs the loss function depends on, on the other hand are flattened and concatenated into two corresponding tensors.

This requires three changes for each loss function:
1. The addition of two layers to the graph, tf.keras.layers.Flatten and tf.keras.layers.Concatenate; and
2. The addition of a pre-processing routine to the dataset that combines the needed labels into a single label, with the same name as the concatenated output.

The addition of a pre-processing step in the loss function to split the combined tensors back into individual tensors. However, some potential drawbacks should be considered. First, the extra steps will introduce some computational overhead. If the model is large, this overhead is negligible, but in some cases this might not be the case. Second, if there are multiple losses and the same tensors are required for more than one loss, then the data is essentially duplicated. Once again, if the model is large, this should be negligible, but if the application is GPU memory bound, or if the training bottleneck is the training data traffic into the GPU, this may need to be considered. Third, the main drawback is that this option assumes that the tensors are all of the same data type. If some labels are tf.float and others are tf.int, then one needs to perform type casts before concatenating and precision might be lost.

A second alternative option in addition to the flatten and concatenate technique is the model.add_loss option, the description of which may be found in further detail at https://www.tensorflow.org/guide/keras/train_and_evaluate#handling_losses and_metrics_that_dont_fit_the standard signature, although the examples given are somewhat trivial and do not depend on label data. The add_loss function essentially allows one to add any tensor to the loss calculation. However, an issue with this approach is that this loss tensor cannot rely on tensors that are outside the computation graph. Specifically, this means that any labels that the loss depends on need to be inserted into the graph as inputs (placeholders). The steps that are required for this option include:
1. The addition of input layers for each of the labels that the loss depends; and
2. The modification of the dataset by copying or moving all relevant labels to the dictionary of features.

For this second alternative, the drawbacks to consider include the default loss mechanism enabling one to easily distinguish between different losses and track them separately. In particular, one can easily separate between the regularization factor of the loss and the rest of the losses. When you use add loss, this essentially mixes all losses together, and thus a mechanism is needed for separating them for tracking (e.g. adding the loss tensors to the model outputs or using tf summaries on the individual loss tensors).

Another drawback to the second alternative is that this technique fails in tf 1 when enabling eager mode, and in tf 2 it only works if one calls tf.compat. v 1 .disable_eager_execution( ) If one depends on eager execution mode for debugging, this might pose an issue.

A third alternative option in addition to the flatten and concatenate technique and the model.add_loss option include the backdoor option. For this technique, the loss function is provided with all of the tensors it requires in a roundabout way, either by extending the tf.keras.loss function and passing the additional tensors in the constructor, similar to what is described at https://www.tensorflow.org/guide/keras/train_and_evaluate#custom_losses with tensors as the parameters, or by wrapping the loss function within a context that can access all required tensors, as illustrated below in the example code snippet:

```
def get_keras_loss_fn (pred_dict, true_dict):
    def keras_loss (y_true, y_pred):
        loss = custom_loss_function(true_dict, pred_dict)
        return loss
    return keras_loss
```

This solution also requires defining input layers (placeholders) for the labels, as well as moving the labels over to the dictionary of features in the dataset. The advantages to this technique is that it does not require flattening/concatenating/casting, but still enables one to maintain separate losses. The one drawback is that, as with the second option described above, the technique is executed only when eager execution is disabled.

An additional point of comparison between the different options should be time performance. This is likely to change from model to model. For large models, the runtime of each of the options were similar when tested, with a slight (3%) advantage to the first and third options over the "add loss" option.

Customizing Training Loops Using tf.keras.callbacks

The tf.keras.callbacks (see https://www.tensorflow.org/api_docs/python/tf/keras/callbacks) APIs enable the insertion of logic at different stages of the training/evaluation loop. TensorFlow offers a number of callbacks for updating the learning rate (LearningRateScheduler), saving checkpoints (ModelCheckpoint), early stopping (EarlyStopping), logging to Tensorboard (TensorBoard), and more. But perhaps most importantly, TensorFlow enables the creation of custom callbacks. These enable the insertion of customizations during the training flow.

In the example developmental flow described herein, these customizations were used to track the training progress, collect statistics, and spawn evaluations on other instances, for instance. Custom TensorFlow keras callbacks are an important tool the example developmental flow, as the level of customization these provide enable one to rely on the default keras.model.fit training loop API rather than requiring a custom solution. It is noted that because the callbacks introduce computation overhead, their overuse should be avoided. Thus, their frequency is limited as part of the example developmental flow, as is the amount of computation in each call.

Evaluating Results Using tf.keras.metrics

Another important tool for tracking the progress of training are tf.keras.metrics (https://www.tensorflow.org/api_docs/python/tf/keras/metrics). As with tf.keras.callbacks, TensorFlow provides several default metrics, as well as the option to implement a custom metric class. Similar to tf.keras.losses, the metric "update_state" function should conform to a specific signature def update_state(self, y_true, y_pred, sample_weight=None), that does not always align with a particular application. In this example developmental flow this is s in a similar manner to the loss constraint solution (by flattening and concatenating, calling the model.add_metric function, and/or passing in additional dependencies in a backdoor fashion).

The metrics are set via the model.compile (https://www.tensorflow.org/api_docs/python/tf/keras/Model#compile) function, and can be modified based on one's needs or the particular application (e.g. whether training or evaluation is running). Contrary to keras callbacks, but similar to keras losses, metrics are part of the computation graph and run in the GPU. Such metrics should be chosen and implemented carefully so as not to introduce unnecessary computational overhead.

Collecting TensorFlow Summaries in tf.keras

In this example developmental flow, TensorBoard summaries are used for tracking and debugging the training. Losses were tracked, gradient histograms generated, and activation outputs then measured. Metrics were logged, confusion matrices displayed, and visual images generated from the output data. TensorBoard may be used to debug intermediate operations performed by the loss function, or to measure the distribution of weights on a specific layer in the graph.

When transitioning to tf.keras, the same tensorboard usages were enabled by creating custom tf.keras.callbacks and model._fit_function.fetches and model._fit_function.fetch_callbacks. As described by TensorFlow, the new mechanism does have some advantages and for many (straight forward) usages, it simplifies the logging procedure, requiring just one step instead of two. However, it is not always clear how to implement more advanced usages.

Thus, the Amazon Sagemaker Debugger (https://sagemaker.readthedocs.io/en/stable/amazon sagemaker_debugger.html) (smdebug) package may be useful for this purpose. Amazon smdebug is a python library for tracing and debugging DNN training. It supports a number of frameworks, including TensorFlow (1 and 2). It provides two main functionalities, a tf.keras.callback for capturing and storing selected tensors, and a set of rules for detecting and acting on anomalies that can occur during training. Some of the primary points of relevance for the example developmental flow described herein include the following:

1. The library can be installed (https://pypi.org/project/smdebug/) independent of Sagemaker. The rule functionality can only be applied in the Sagemaker environment, but the debugging hook can run anywhere.
2. The way to use the debugging hook is by defining a set of collections of tensors to be tracked, and passing them to the hook constructor. The hook will capture these tensors, according to the frequency chosen, and store them to a pre-configured location. Additionally, it includes the option to log summaries related to the chosen tensors to TensorBoard.
3. There are also a number of advantages to the debugging capabilities enabled by smdebug over TensorBoard. One is that smdebug enables the capture of full tensors (as opposed to just scalars, histograms, images, etc.).
4. Additionally, smdebug enables free access to the captured data. As opposed to TensorFlow, it can be decided after the fact how to display the data. For example, if one wants to calculate the average of a metric over a fixed window of time, one would need to somehow extract the metric data from the tensor flow event files.

Optimizing Training Time

The motivation for optimizing training time is rather obvious. There are constant pressures to reduce overall development time and be the first to market. Moreover, the motivation to optimize (maximize) utilization of training resources should also be obvious. The goal should be maximizing utilization of all of the resources, but most importantly the GPUs which are the most expensive resource. GPUs cost a lot of money, and letting them sit idle, even partially idle, is wasteful.

It is also critical to have the tools for in-depth analysis of the training pipeline. These tools should be built around basic tools for measuring resource utilization (e.g. nvidia-smi or the Sagemaker instance metrics) and tf profiler (https://www.tensorflow.org/guide/profiler), for profiling your model. There are also many techniques for improving performance (e.g. mixed precision (https://www.tensorflow.org/guide/keras/mixed_precision)). The techniques implemented should be dictated by the profiling data.

Still further, a way to optimize training time is to perform distributed training. However, once again, in depth profiling should be a prerequisite for doing so. In some cases, developers might rush to distribute their training to 8 GPUs, only to learn later that they are actually only using the equivalent computing power of 1 GPU. They very well might have been able to train just as effectively, and for an eighth of the cost, on a single GPU by making some simple changes to their training flow.

What is claimed is:

1. A machine learning model training system, comprising:
one or more processors; and
a memory configured to store instructions that, when executed by the one or more processors, cause the one or more processors to:
receive labeled training data from a data storage, the labeled training data comprising data labels of respective pixels of road scenes that identify objects and object types with which the respective pixels are associated;

transform the labeled training data to a record file format to generate transformed record file data; and perform, via a machine learning training utility, training and evaluation of the transformed record file data to generate a machine learning trained model, wherein the machine learning trained model is deployed in a vehicle and utilized by a machine vision system of the vehicle to recognize and classify objects included in a road scene and to cause one or more automated driving and/or navigation tasks to be performed based upon a type of object that is detected via the machine vision system, wherein a first level of data shuffling is performed on the received labeled training data to generate the transformed record file data, wherein a second level of data shuffling is performed with respect to an order of the transformed record file data in a data pipe stream prior to the training and evaluation of the transformed record file data via a training environment, the data pipe stream comprising a plurality of data pipes, wherein a third level of data shuffling is performed on the transformed record file data at a file level during the training and evaluation of the transformed record file data to generate the machine learning trained model, wherein the first level, the second level, and the third level of data shuffling function to enable the machine learning training utility to randomly access samples in the labeled training data to generate the machine learning trained model, and wherein the one or more processors are configured to:
perform training and evaluation of the transformed record file data via the training environment, utilize a pipe mode of operation to receive the transformed record file data via the data pipe stream, which decouples the data storage from the training environment, identify under-represented transformed record file data based upon the training and evaluation of the transformed record file data via the training environment, and utilize at least one of the plurality of data pipes as a dedicated data pipe to provide the under-represented transformed record file data for the training and evaluation of the transformed record file data in a subsequent iteration through the training environment.

2. The system of claim 1, wherein the one or more processors are configured to perform the first level of data shuffling by parsing the received labeled training data to generate recorded labeled training data.

3. The system of claim 2, wherein the one or more processors are configured to perform the first level of data shuffling by randomly grouping the recorded labeled training data into predetermined target file sizes and predetermined file formats to generate the transformed record file data.

4. The system of claim 3, wherein the predetermined target file size is 100 megabytes, and wherein the predetermined file format is a TFRecord file format.

5. The system of claim 1, wherein the one or more processors are configured to perform the third level of data shuffling by executing a TensorFlow dataset shuffle function on the transformed record file data at the file level.

6. The system of claim 1, wherein the one or more processors are configured to perform the second level of data shuffling as part of a preprocessing stage that utilizes a Sagemaker ShuffleConfig class.

7. The system of claim 1, wherein the one or more processors are configured to utilize one or more of the following to receive the transformed record file data:

TFRecordDatasets pointing directly to files in the data storage;

parsing of the transformed record file data;

downloading of the transformed record file data directly from the data storage; and downloading of the transformed record file data via a managed third-party file system solution.

8. A non-transitory computer-readable medium having instructions stored thereon that, when executed by one or more processors, cause the one or more processors to:

receive labeled training data from a data storage, the labeled training data comprising data labels of respective pixels of road scenes that identify objects and object types with which the respective pixels are associated;

transform the labeled training data to a record file format to generate transformed record file data;

perform, via a machine learning training utility, training and evaluation of the transformed record file data to generate a machine learning trained model, wherein the machine learning trained model is deployed in a vehicle and utilized by a machine vision system of the vehicle to recognize and classify objects included in a road scene and to cause one or more automated driving and/or navigation tasks to be performed based upon a type of object that is detected via the machine vision system, wherein a first level of data shuffling is performed on the received labeled training data to generate the transformed record file data, wherein a second level of data shuffling is performed with respect to an order of the transformed record file data in a data pipe stream prior to the training and evaluation of the transformed record file data via a training environment, the data pipe stream comprising a plurality of data pipes, wherein a third level of data shuffling is performed on the transformed record file data at a file level during the training and evaluation of the transformed record file data to generate the machine learning trained model, and wherein the first level, the second level, and the third level of data shuffling function to enable the machine learning training utility to randomly access samples in the labeled training data to generate the machine learning trained model, perform training and evaluation of the transformed record file data via the training environment, utilize a pipe mode of operation to receive the transformed record file data via a data pipe stream that decouples the data storage from the training environment, identify under-represented transformed record file data based upon the training and evaluation of the transformed record file data via the training environment, and utilize at least one of the plurality of data pipes as a dedicated data pipe to provide the under-represented transformed record file data for the training and evaluation of the transformed record file data in a subsequent iteration through the training environment.

9. The non-transitory computer-readable medium of claim 8, wherein the instructions further cause the one or more processors to perform the first level of data shuffling by parsing the received labeled training data to generate recorded labeled training data.

10. The non-transitory computer-readable medium of claim 9, wherein the instructions further cause the one or more processors to perform the first level of data shuffling by randomly grouping the recorded labeled training data into predetermined target file sizes and predetermined file formats to generate the transformed record file data.

11. The non-transitory computer-readable medium of claim 10, wherein the predetermined target file size is 100 megabytes, and wherein the predetermined file format is a TFRecord file format.

12. The non-transitory computer-readable medium of claim 8, wherein the instructions further cause the one or more processors to perform the third level of data shuffling by executing a TensorFlow dataset shuffle function on the transformed record file data at the file level.

13. The non-transitory computer-readable medium of claim 8, wherein the instructions further cause the one or more processors to perform the second level of data shuffling as part of a preprocessing stage that utilizes a Sagemaker ShuffleConfig class.

14. The non-transitory computer-readable medium of claim 8, wherein the instructions further cause the one or more processors to utilize one or more of the following to receive the transformed record file data:

TFRecordDatasets pointing directly to files in the data storage;

parsing of the transformed record file data;

downloading of the transformed record file data directly from the data storage; and downloading of the transformed record file data via a managed third-party file system solution.

15. The system of claim 1, wherein the one or more processors are configured to utilize the pipe mode of operation to receive the transformed record file data via the data pipe stream without utilizing local storage in addition to the memory.

16. The system of claim 1, wherein the third level of data shuffling is performed on a training instance during the training and evaluation of the transformed record file data, and wherein the second level of data shuffling performed in the data pipe stream prior to the training and evaluation of the transformed record file data is not performed on the training instance.

* * * * *